(12) United States Patent
Swensen et al.

(10) Patent No.: US 9,218,437 B1
(45) Date of Patent: *Dec. 22, 2015

(54) SYSTEMS AND METHODS PROVIDING EVENT DATA

(71) Applicant: AMAZON TECHNOLOGIES, INC., Reno, NV (US)

(72) Inventors: Gregory Richard Swensen, Lynnwood, WA (US); Melissa Elaine Davis, Edmonds, WA (US); Miles Childs Kaufmann, Seattle, WA (US); Thomas Lowell Keller, Renton, WA (US); Muhammad Ali Siddiqui, Snoqualmie, WA (US); Amos Dylan Vance, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/040,617

(22) Filed: Sep. 27, 2013

(51) Int. Cl.
*G06F 15/16* (2006.01)
*G06F 21/60* (2013.01)
*G06F 17/30* (2006.01)

(52) U.S. Cl.
CPC ............................... *G06F 17/30943* (2013.01)

(58) Field of Classification Search
CPC   G06F 17/2705; G06F 21/60; G06F 17/30943
USPC ...................... 709/223, 224; 726/28; 707/755
See application file for complete search history.

(56) References Cited

U.S. PATENT DOCUMENTS

| 6,108,308 | A  | * | 8/2000  | Flavin et al. ................... 370/238 |
| 6,359,857 | B1 | * | 3/2002  | Ahmad et al. ................ 370/217 |
| 6,542,461 | B1 | * | 4/2003  | Faye et al. ..................... 370/225 |
| 7,756,959 | B1 | * | 7/2010  | Beshai et al. ................. 709/223 |
| 8,161,463 | B2 | * | 4/2012  | Johnson et al. ............... 717/136 |
| 8,295,280 | B2 | * | 10/2012 | Gopalakrishna et al. ..... 370/389 |
| 8,774,200 | B2 | * | 7/2014  | Beshai .......................... 370/406 |
| 8,837,497 | B2 | * | 9/2014  | Beshai et al. ................. 370/400 |
| 2002/0083195 | A1 | * | 6/2002 | Beshai et al. ................. 709/238 |
| 2003/0126246 | A1 | * | 7/2003 | Blouin et al. ................. 709/223 |
| 2007/0005734 | A1 | * | 1/2007 | Abdo ............................ 709/219 |
| 2007/0180519 | A1 | * | 8/2007 | Boccon-Gibod et al. ....... 726/21 |
| 2008/0034439 | A1 | * | 2/2008 | Chen et al. ..................... 726/27 |
| 2009/0037422 | A1 | * | 2/2009 | Wong et al. ..................... 707/10 |
| 2010/0135211 | A1 | * | 6/2010 | Park et al. ..................... 370/328 |
| 2011/0008016 | A1 | * | 1/2011 | DeLaney et al. ............. 386/249 |
| 2011/0113475 | A1 | * | 5/2011 | Garcia Morchon et al. ...... 726/4 |
| 2012/0213062 | A1 | * | 8/2012 | Liang et al. ................... 370/228 |
| 2013/0212268 | A1 | * | 8/2013 | Fu et al. ........................ 709/224 |
| 2014/0047538 | A1 | * | 2/2014 | Scott et al. ...................... 726/22 |

OTHER PUBLICATIONS

Patel, Haresh N., "Notice of Allowance dated Nov. 24, 2014", U.S. Appl. No. 14/040,610, The United States Patent and Trademark Office, Nov. 24, 2014.

\* cited by examiner

*Primary Examiner* — Haresh N Patel
(74) *Attorney, Agent, or Firm* — Lindauer Law, PLLC

(57) ABSTRACT

Computer applications may generate a large volume of different types of record data. In one example, the large volume of record data may represent millions of different processes occurring every second. Described herein are systems, methods and devices for generating parsed data based on the large volume of record data. The parsed data may be consumed by computing nodes within a designated amount of time from the generation of the record data.

20 Claims, 23 Drawing Sheets

SYSTEMS AND METHODS PROVIDING EVENT DATA

BACKGROUND

Computer systems may generate a large volume of different types of log data representing millions of different processes occurring every second. Because of differences in the types of data, variability in expressing that data, the volume of the log data, and so forth, it is difficult for applications to consume the data in near real-time.

Figure 1:
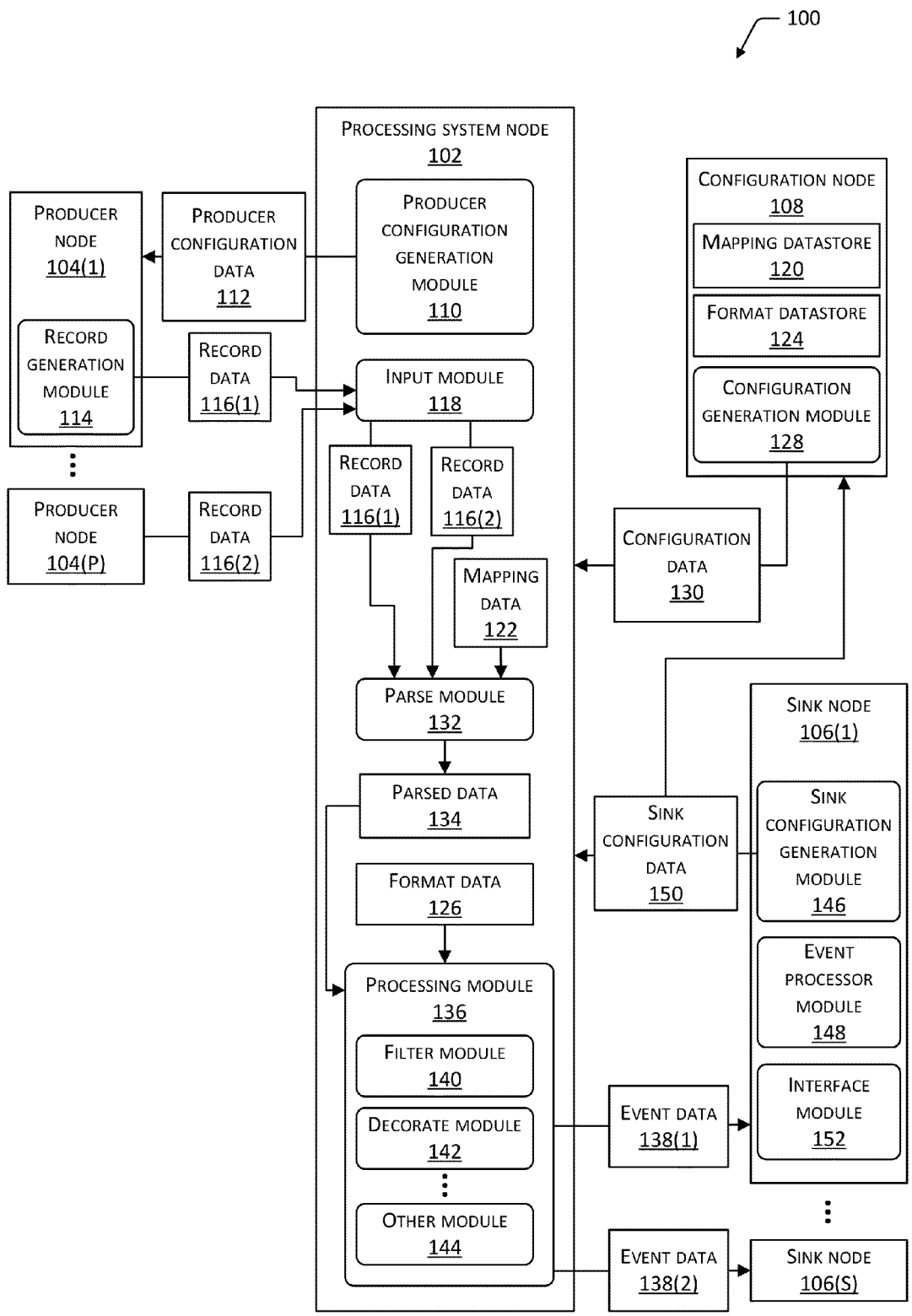
FIG. 1 is a block diagram of a system configured to generate parsed data based on record data from producer nodes and mapping data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

INCORPORATION BY REFERENCE

U.S. patent application Ser. No. 09/157,198, now U.S. Pat. No. 6,266,649, filed on Sep. 18, 1998, titled "Collaborative Recommendations Using Item-to-Item Similarity Mappings" to Gregory D. Linden, et al. is incorporated by reference in its entirety into this disclosure.

U.S. patent application Ser. No. 11/841,926, now U.S. Pat. No. 7,921,042, filed on Aug. 20, 2007, titled "Computer Processes for Identifying Related Items and Generating Personalized Item Recommendations" to Jennifer A. Jacobi, et al. is incorporated by reference in its entirety into this disclosure.

U.S. patent application Ser. No. 11/863,108, now U.S. Pat. No. 7,779,040, filed on Sep. 27, 2007, titled "System for Detecting Associations Between Items" to Cory Hicks is incorporated by reference in its entirety into this disclosure.

U.S. patent application Ser. No. 13/174,601, now U.S. Pat. No. 8,706,860, filed on Jun. 30, 2011, titled "Remote Browsing Session Management" to Mathew L. Trahan, et al. is incorporated by reference in its entirety into this disclosure.

DETAILED DESCRIPTION

Computer systems may generate a large volume of different types of record data, such as log data representing millions of different processes occurring every second. The record data may have many different types and may be expressed in many different ways. Due to the differences in the types of record data, variability in expressing that record data, the volume of the record data, and so forth, it is difficult for applications to perform computational tasks using the data in near real-time. Also, as the volume of record data continues to grow in size, determining the resource usage associated with the performance of the computational tasks has become challenging. In addition, as the volume of record data continues to grow in size, users (e.g., internal business users) may desire to customize the record data for more efficient processing.

This disclosure relates to systems and methods for transforming the record data into parsed data. A processing system node is configured to transform the record data into the parsed data. The processing system node is made up of one or more computing nodes, which can perform functions described in this disclosure. These functions may be executed as one or more services. The processing system node generates parsed data from the record data in real time or near real time. Users, such as internal business users, may configure the processing system node to transform the parsed data into event data. The processing system node provides the event data to sink nodes. The sink nodes may use the event data for computational tasks. For example, a particular sink node may analyze the event data to determine whether a user has incorrectly been granted access to a particular piece of content, such as a document or movie.

The processing system node may have an application programming interface configured to provide a common set of service calls, which may be used by one or more services executing on one or more nodes. The application programming interface may be implemented as one or more libraries including routines, data structures, object classes, variables, and so forth, associated with operation of the system described herein.

The record data represents various information about activities associated with producer nodes. The record data may comprise at least one of data indicating that a computing device has been accessed, data indicating that information was transferred to the computing device, data indicating an occurrence of an error, and so forth. The producer nodes may comprise computing nodes having computing devices configured to implement certain functions described in this disclosure as one or more services.

Record data from different sources may have different types. For example, the record data may be different in layout, composition, encoding, and so forth. A first producer node may generate record data having a first type or expression, and a second producer node may generate record data having a second, different type or expression. For example, the first producer node may generate record data comprising the text "LOGIN", indicating that a particular computing device has been accessed, and the second producer node may generate record data comprising the text "USER HAS SIGNED IN", indicating that another particular computing device has been accessed. In this example, the record data generated by the first and second producer nodes indicate a same or similar activity has occurred, namely, the activity of logging onto a computing device. However, the generated text of the record data is expressed differently. That is, the text "LOGIN" has a different expression than the text "USER HAS SIGNED IN", but this text indicates a same or similar activity has occurred.

In some implementations, the record data includes record entries. A particular record entry may comprise data about an activity associated with a producer node. For example, generated record data may include a first record entry indicating that a particular computing device has been accessed and a second record entry indicating the user that accessed the particular computing device. As discussed in more detail below, to generate parsed data, the record entries may be mapped to parsed entries.

The parsed data may be described as transformed or otherwise processed record data. In some implementations, the parsed data includes parsed entries. A parsed entry may be described as a transformed or otherwise processed record entry. As discussed in more detail below, the parsed data may be further processed into event data which may be used by other computing nodes to perform computational tasks.

The record data may be transformed into parsed data in real time or near real time using one or more transformation functions. As used in this disclosure, near real time may be a period of time less than or equal to 20 seconds. By transforming the record data into parsed data in near real time, computing systems may consume large volumes of different types of record data in near real time. Transforming the record data into parsed data in real time or near real time may include allocating the record data to certain data processing modules when the record data is received by the processing system node. Transforming the record data into parsed data in real time or near real time may include generating parsed data as the record data is received by the processing system node.

The record data may be transformed into parsed data as instantaneously as possible. The amount of time to transform the parsed data may be limited by various factors. The factors may include the ability to receive the record data, the ability of the hardware or software to receive or access the record data and perform the transformation, and so forth.

In some implementations, the record data is transformed into parsed data in real time or near real time because the processing system node performs the transformation as the processing system receives the record data. Once the processing system node receives the record data, the processing system node may perform its functions by maintaining the record data in the primary system memory, as compared to the secondary system memory. Due to faster read/write times, reduced contention, or other factors, data transfer with the primary system memory is greater than the secondary system memory. As a result, the time for processing the record data is reduced compared to systems which rely on storage in the secondary system memory. This may reduce overall processing time, allowing the record data to be transformed into parsed data in real time or near real time as the processing system node receives the record data.

Transforming the record data into parsed data in near real time may be described as transforming the record data substantially immediately once the processing system node receives the record data. In some examples, substantially immediately may be described as within a designated period of time, such as five seconds.

In one example, the processing system node may transform the record data into parsed data by converting the record entries into the parsed entries. For example, a first record entry of "LOGIN" may be converted to a first parsed entry of "L", and a second record entry of "User has signed in" may be converted to a second parsed entry of "L".

The processing system node may transform the record data into parsed data in real time or near real time by mapping record entries to parsed entries. For example, the record data may include a first record entry comprising text data indicating a date and a second record entry comprising text data indicating a unique identifier of a computing device. The text data indicating the date may be mapped to a first parsed entry, which may comprise a different expression of the date. For example, a date of "Aug. 4, 2013" may be mapped to "2013-08-04". The text data indicating the unique identifier may be mapped to a second parsed entry. For example, a unique identifier of "94_1234-56" may be mapped to "9412356".

The processing system node may generate parsed data, which reorders the order of record entries. For example, the first record entry may include text data comprising "LOGIN" and the second record entry may include text data comprising "2013-07-08", indicating a particular date that a user logged onto a computing device. In this example, the order of the record entries may be changed such that the resulting parsed data comprises a first parsed entry comprising text data "2013-07-08" and a second parsed entry including text data comprising "LOGIN".

In addition to reordering the order of the record entries, the processing system node may transform the record data by converting the record data such that the record entries conform to a designated standard. For example, a first record entry may include text data comprising "Jul. 17, 2013" and a second record entry which includes text data comprising "28MAY2013". The designated standard may include dates having the following format: four digit year, two digit month, and two digit day. In this example, the first record entry may be converted from "Jul. 17, 2013" to "2013-07-17", and the second record entry may be converted from "28MAY2013" to "2013-05-28".

The processing system node may perform more than one process with regard to the record data to generate the parsed data. For example, the processing system node may reorder the record entries and convert the record entries.

In some implementations, the processing system node may add resources to process data. For example, the processing system node may add computing devices to transform the record data into parsed data. The processing system node may determine that the record data is not being transformed into the parsed data within a certain amount of time, or within real time or near real time. Based on this determination, the processing system node may add resources, such that the record data is transformed within the certain amount of time. Because the processing system node may add resources to process the record data, the processing system node provides scalability for the overall system. That is, additional processing system nodes may be added to handle in parallel an increasing amount of data.

The processing system node may include different parse modules configured to handle different types of record data. The different parse modules may be optimized to handle certain types of record data. In one example, the processing system node includes a first parse module and a second parse module. A first producer node may generate first record data having a first type, and a second producer node may generate second record data having a second type. The first parse module may be configured to process the first record data and not process the second record data. The second parse module may be configured to process the second record data and not process the first record data.

The processing system node may be configured to allocate the different record data to the different parse modules based on information included in the record data. The information may include data which identifies the computing node that generated the record data. For example, a first record data may include data indicating that the first record data was generated from a first producer node. Based on the information indicating that the first record data was generated from the first producer node, the processing system node may provide the first record data to a parse module that is optimized to process record data from the first producer node.

In some implementations, the processing system node is configured to generate event data by transforming the parsed data. The processing system node may generate the event data by transforming the parsed data in real time or near real time. As discussed in more detail below, the event data may be used by other computing nodes, such as sink nodes, to perform various computational tasks. For example, the sink node may use the event data to determine whether a particular user has incorrectly accessed a piece of content.

The processing system node may transform the parsed data into event data using one or more processes. For example, the processing system node may transform the parsed data into event data by applying format data to the parsed data. The format data may comprise information about configuring the processing system node to format the parsed data. In one example, the format data comprises an expression language. The processing system node may store different format data for different sink nodes. Different sink nodes may cause the processing system node to perform different functions on the parsed data based on the different format data. For example, a first sink node may only be interested in user data and therefore may cause the processing system node to filter out all data from the parsed data except the user data. Continuing the example, a second sink node may only be interested in data about a computing device being accessed and therefore may cause the processing system node to filter out all data from the parsed data except the data about the computing device being accessed.

The processing system node may apply the format data to the parsed data using one or more various functions. Applying the format data to the parsed data may include filtering one or more parsed entries from the parsed data. For example, a first parsed entry may include text data comprising "2012-08-28", and a second parsed entry may include text data comprising a unique identifier of "8765-4321". The processing system node may filter the parsed data by removing the date "2012-08-28", such that the resulting event data comprises only the unique identifier.

In another example, applying the format data to parsed data may include decorating the parsed data. Decorating may be described as adding information to the parsed data. For example, the parsed data may comprise a parsed entry including text data comprising an Internet Protocol ("IP") address. The IP address may be decorated by adding additional information such as location data associated with that IP address.

In another example, applying the format data to parsed data may include changing the order of parsed entries. For example, the first parsed entry may include text data comprising a time value of "12:34:06", and the second parsed entry may include text data comprising "2012-03-31", indicating a particular date. In this example, the order of the parsed entries may be changed such that the resulting event data comprises a first event entry comprising the text data "2012-03-31", and a second event entry including text data comprising "12:34:06".

The sink node may comprise one or more computing nodes. The one or more computing nodes may comprise computing devices, which may include hardware processors and memory devices. The computing devices may be configured to implement certain functions described in this disclosure as one or more services. The sink node may use the event data to perform various computing tasks. For example, the sink node may be configured to analyze the parsed data to determine whether a designated computing device has been accessed by an unauthorized user. In another example, the sink node may be configured to analyze the parsed data to determine whether a particular document has been accessed by an unauthorized user.

In some implementations, the event data comprises configuration data. For example, the event data may comprise data which causes the sink node to provide one of a plurality of treatments to a media device. The treatments may comprise web pages. For example, based on a first treatment, the media device may display a web page which includes an advertisement at the upper right side portion of the display screen of the media device. Based on a second treatment, the media device may display the web page with the advertisement at a lower, centered position of the display screen.

In some implementations, the sink node is configured to generate sink configuration data. The sink configuration data may comprise various information. For example, the sink configuration comprises the format data. The sink node may enable an administrative user to operate with the sink node to generate the format data based on user input.

In another example, the sink configuration data comprises percentage data, which is configured to cause the processing system node to provide a portion of the generated event data to the sink node. For example, an administrative user may operate with the sink node and enter in a value of "50 percent". Based on the entered value of "50 percent", the sink node may generate sink configuration data, which includes the value of "50 percent", and provide the sink configuration data to the processing system node. Using the value of "50 percent", the processing system node may provide every other generated event data to the sink node. In some implementations, the sink node may only need a representative set of the event data, rather than a complete set of the event data. By providing a representative set of the event data, the processing system node may increase the speed of providing data to the sink node because less data is needed. In some implementations, the processing system node may provide both the complete set of event data and a subset of the complete set of event data that may be used for faster processing. The subset of event data may be processed at a cheaper cost when compared to processing the complete set of event data.

By generating parsed data within a designated amount of time after a generation of a large amount of record data, sink nodes may perform computational tasks in real time or near real time. Performing tasks in real time or near real time using the record data may provide many advantages. For example, unauthorized access to computing devices or content may be detected quickly. Further, by enabling administrative users to configure the processing system node to apply customized processes to the parsed data, sink nodes may receive specific structured data for executing computational tasks, rather than receiving a large amount of unstructured data.

Illustrative System

FIG. 1 is a block diagram of a system 100 configured to generate parsed data based on record data and mapping data. The system 100 includes a processing system node 102, producer nodes 104(1), . . . , 104(P), sink nodes 106(1), . . . , 106(S), and a configuration node 108. The processing system node 102 is communicatively coupled to the producer nodes 104(1), . . . , 104(P), the sink nodes 106(1), . . . , 106(S), and the configuration node 108 using one or more networks. The processing system node 102, the producer nodes 104(P), the sink nodes 106(S), and the configuration node 108 may comprise one or more computing devices. The computing device may have one or more hardware processors and one or more memory devices, which may perform the one or more of functions described in this disclosure. These functions may be executed as one or more services. One or more different computing devices may be configured to implement the computing nodes discussed herein. For example, a first computing device may implement a first producer node 104, a second computing device may implement the processing system node 102, and a third computing device may implement the sink node 106. In another example, a first plurality of computing devices may implement the processing system node 102, and another computing device may implement the producer node 104 and the sink node 106. The producer nodes 104(P) may or may not be similar in construction, components, modules, and so forth, and the sink nodes 106(S) may or may not be similar in construction, components, modules, and so forth. For example, sink nodes 106(S) may include different modules configured to perform different computational tasks. The configuration node 108 and the processing system node 102 may or may not be similar in construction, components, modules, and so forth.

The processing system node 102 may include a producer configuration generation module 110 configured to generate producer configuration data 112. The producer configuration data 112 may comprise information about configuring the producer node 104(1). For example, the producer configuration data 112 may comprise identification data that identifies the processing system node 102. The identification data may cause the producer node 104(1) to provide data to the identified processing system node 102. In FIG. 1, the producer configuration generation module 110 provides the producer configuration data 112 to the producer node 104(1).

The producer node 104(1) includes a record generation module 114 configured to generate record data 116(1). The record data 116(1) may include various data about one or more activities associated with the producer node 104(1). For example, the record data 116(1) may comprise data indicating that the producer node 104(1) has been accessed, data indicating that certain information was transferred to the producer node 104(1), data indicating an error occurred at the producer node 104(1), and so forth. The record data 116(1) may be a different type of data from the record data 116(2). For example, the record data 116(1) may be different in layout, composition, or encoding from the record data 116(2). For example, the record data 116(1) may comprise the text "LOGIN", and the record data 116(2) may comprise the text "USER HAS SIGNED IN". The record data 116(1) may include record entries (not shown). A particular record entry may comprise data about an activity associated with a producer node 104(P). For example, the record data 116(1) may include a first record entry indicating that a particular computing device has been accessed and a second record entry indicating the user which accessed the particular computing device.

In FIG. 1, the record generation module 114 provides the record data 116(1) to an input module 118 of the processing system node 102. The input module 118 may be configured to receive different record data 116 from different producer nodes 104(P). For example, in FIG. 1, the input module 118 receives the record data 116(1) from the producer node 104(1) and the record data 116(2) from the producer node 104(P). As discussed in more detail below, for optimization purposes, the input module 118 may allocate different record data 116 to different parse modules 132 of the processing system node 102.

Once the input module 118 receives the record data 116, the record data 116 may be by maintained in a primary system memory, as compared to a secondary system memory. Due to faster read/write times, reduced contention, or other factors, data transfer with the primary system memory is greater than the secondary system memory. As a result, the time for processing the record data 116 is reduced compared to systems which rely on storage in the secondary system memory.

The configuration node 108 may include a mapping datastore 120 configured to store mapping data 122, a format datastore 124 configured to store format data 126, and a configuration generation module 128 configured to generate configuration data 130. The mapping datastore 120 and the format datastore 124 may comprise data structures stored on one or more memory devices.

The configuration data 130 may comprise information about configuring the processing system node 102 to generate parsed data 134 and event data 138, which are discussed in more detail below. The configuration data 130 may also include information about configuring the producer nodes 104. Once the processing system node 102 receives the configuration data 130, the processing system node 102 may apply the configuration data 130 to generate at least one of the parsed data 134 and the event data 138. This application may occur within a designated period of time after the generation of the configuration data 130. For example, the application may occur within fifteen seconds after the generation of the configuration data 130. Because the configuration data 130 may be applied by the processing system node 102 within the designated period of time, sink nodes 106 may acquire more relevant data, resulting in a more efficient process.

The configuration data 130 may be generated based on machine learning. For example, a first sink node 106 may generate the configuration data 130 in response to a determination by a second sink node 106 that a need exists to start including new information. The second sink node 106 may provide data to the first sink node 106 which causes the first sink node to automatically generate the configuration data 130.

In some implementations, the configuration node 108 includes an interface for enabling users to operate with the interface to generate the configuration data 130 based on user input. The interface may include, for example, a web interface or an application programming interface.

The mapping data 122 may comprise data about associating or mapping the record data 116 with other data. Mapping the record data 116 is discussed in more detail below. The configuration node 108 may provide the mapping data 122 to the processing system node 102. In one example, the configuration node 108 provides the mapping data 122 to the processing system node 102 in response to a request from the processing system node 102. The configuration node 108 may enable the mapping data 122 to be configurable. In one example, the configuration node 108 may provide a user interface (not shown), which enables an administrative user to modify the mapping data 122. The configuration node 108 may provide the mapping data 122 as configuration data 130.

The format data 126 may comprise information about configuring the processing system node 102. The application of the format data 126 is discussed in more detail below. The configuration node 108 may provide the format data 126 to the processing system node 102. In one example, the configuration node 108 provides the format data 126 to the processing system node 102 in response to a request from the processing system node 102. The configuration node 108 may enable the format data 126 to be configurable. In one example, the configuration node 108 includes a user interface (not shown) which enables an administrative user to modify the format data 126. The configuration node 108 may provide the format data 126 as the configuration data 130. By storing the format data 126 at the format datastore 124, more than one sink node 106 may use the format data 126 stored at the format datastore 124. The format data 126 may be constructed in a hierarchical fashion. For example, the processing system node 102 may generate formatted data by applying a first format data 126 to a relatively large amount of parsed data 134, and then a second format data 126 may be applied to the formatted data. By constructing the format data 126 in a hierarchical fashion, the processing system node 102 may generate data more efficiently.

The processing system node 102 may include a parse module 132. In FIG. 1, the parse module 132 generates the parsed data 134. The parse module 132 may generate the parsed data 134 by transforming the record data 116 based on the mapping data 122. For example, the record data 116(1) may include a first record entry comprising text data indicating a date and a second record entry comprising text data indicating a unique identifier of a computing device. The text data indicating the date may be mapped to a first parsed entry, which may comprise a different expression of the date. For example, a date of "Aug. 4, 2013" may be mapped to "2013-08-04". The text data indicating the unique identifier may be mapped to a second parsed entry. For example, a unique identifier of "94_1234-56" may be mapped to "9412356".

The parse module 132 may generate the parsed data 134 at a rate which is greater than or equal to a rate at which the record data 116 is received. Such a configuration may cause the processing system node 102 to operate as a real time or near real time system.

In some implementations, the same or similar record data 116 may be transformed into different parsed data 134 based on modifications to the mapping data 122. For example, at a first point in time, a first record entry of "Aug. 4, 2013" may be changed to a first parsed entry of "2013-08-04". Thereafter, the mapping data 122 may be modified such that a second record entry of "Aug. 4, 2013" may be changed to a second parsed entry of "AUG-2013".

The record data 116(1) may be transformed into the parsed data 134 in real time or near real time by converting the record entries of the record data 116(1) into parsed entries, which comprise the parsed data 134. For example, a first record entry of "LOGIN" may be converted to a first parsed entry of "L", and second record entry of "User has signed in" may be converted to a second parsed entry of "L".

In addition to converting the record entries, the parse module 132 may generate the parsed data 134 by reordering the record entries of the record data 116(1). For example, the first record entry may include text data comprising "LOGIN", and the second record entry may include text data comprising "2013-07-08", indicating a particular date that a user logged onto a computing device. The order of the record entries may be changed such that the resulting parsed data 134 comprises a first parsed entry comprising text data "2013-07-08" and a second parsed entry including text data comprising "LOGIN".

Although the example illustrated in FIG. 1 shows the processing system node 102 having one parse module 132, the processing system node 102 may have more than one parse module 132 configured to generate parsed data 134. In some implementations, the different parse modules 132 are configured to handle different record data 116. These different parse modules 132 may be optimized to handle different record data 116.

In some implementations, the processing system node 102 adds one or more parse modules 132 to generate the parsed data 134. The processing system node 102 may add the one or more parse modules 132 if the record data 116 is not being transformed into the parsed data 134 within a certain amount of time. In this example, the processing system node 102 may add the one or more parse modules 132 such that that record data 116 is transformed within the certain amount of time. Because the processing system node 102 may add resources such as parse modules 132 to process the record data 116, the processing system node 102 provides scalability for the overall system 100.

The processing system node 102 may include one or more processing modules 136 comprising various modules used to generate event data 138. The event data 138 may be described as transformed or otherwise processed parsed data 134. For example, in FIG. 1, the processing module 136 includes a filter module 140, a decorate module 142, and other modules 144. The filter module 140 may be configured to filter one or more parsed entries from the parsed data 134. For example, the parsed data 134 may comprise a first parsed entry including text data comprising "2012-08-28" and a second parsed entry including text data comprising a unique identifier of "8765-4321". The filter module 140 may filter the parsed data 134 by removing the "2012-08-28", such that the resulting event data 138 comprises only the unique identifier. The decorate module 142 may be configured to decorate the parsed data 134. For example, the parsed data 134 may comprise a parsed entry including text data comprising an IP address. The IP address may be decorated by adding additional information such as location data associated with the IP address. The other module 144 may be configured to perform various other functions to generate the event data 138. For example, the other module 144 may reorder the parsed entries to generate the event data 138. In another example, the other module 144 may convert the parsed data 134 into event data 138 comprising markup language, such as extensible markup language (XML).

In FIG. 1, the processing module 136 provides the event data 138(1) to the sink node 106(1). The sink node 106(1) is configured to perform computational tasks using the event data 138(1). The sink node 106(1) may include an event processor module 148 configured to perform the computational tasks. In one example, the computational task includes generating alarm data, which indicates that a user has been granted access to a particular document.

The sink node 106(1) may include a sink configuration generation module 146 configured to generate sink configuration data 150. The sink configuration data 150 may comprise information about configuring the processing system node 102. For example, the sink configuration data 150 may include the format data 126 discussed above with regard to the format datastore 124. In some implementations, the sink node 106(1) provides the sink configuration data 150 to the configuration node 108. In other implementations, the sink node 106(1) provides the sink configuration data 150 to the processing system node 102.

The sink node 106(1) may include an interface module 152 that enables administrative users to operate with the processing system node 102 to generate the format data 126 based on user input. In some implementations, another computing device (not shown) includes the interface module 152, which enables the administrative user to generate the format data 126 based on user input.

By enabling administrative users to operate with computing devices to generate the sink configuration data 150, sink nodes 106 may receive specific structured data for executing computational tasks, rather than receiving a large amount of unstructured data.

Figure 2:
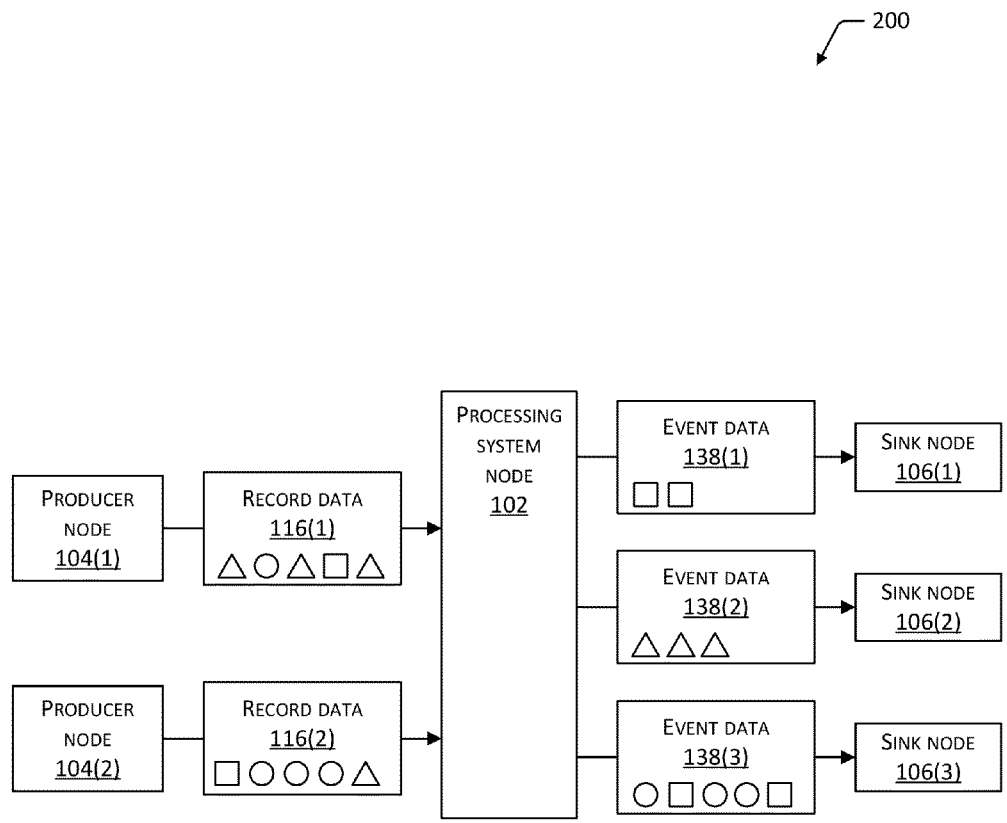
FIG. 2 is block diagram of a system configured to generate, from the parsed data, event data for different sink nodes.

FIG. 2 is block diagram 200 of a system configured to generate, from the parsed data 134, event data 138(1), 138(2), and 138(3) for sink nodes 106(1), 106(2), and 106(3). The producer node 104(1) provides record data 116(1) to the processing system node 102, and the producer node 104(2) provides record data 116(2) to the processing system node 102.

In FIG. 2, the record data 116(1) includes five record entries illustrated as different shapes. That is, the record data 116(1) includes a first record entry illustrated as a first triangle, a second record entry illustrated as a circle, a third record entry illustrated as a second triangle, a fourth record entry illustrated as a square, and a fifth record entry illustrated as a third triangle. The record entries may represent different information associated with the producer node 104(1). The record data 116(2) includes five record entries illustrated as different shapes. That is, the record data 116(2) includes a first record entry illustrated as a square, a second record entry illustrated as a first circle, a third record entry illustrated as a second circle, a fourth record entry illustrated as a third circle, and a fifth record entry illustrated as a triangle.

In one example, the triangles may represent data about users accessing particular devices, circles may represent data indicating that an item was purchased, and squares may represent an indication that an error occurred. FIG. 2 illustrates that event data 138(1) comprises two square record entries. An administrative user associated with the sink node 106(1) may have configured the processing system node 102 to generate the event data 138(1) to include only data about indications of errors. The event data 138(2) may comprise three triangle record entries because an administrative user associated with the sink node 106(2) may have configured the processing system node 102 to generate the event data 138(2) such that only data about accessing particular devices is included. The event data 138(3) may comprise three circle record entries and two square record entries because an administrative user associated with the sink node 106(3) may desire for the event data 138(3) to include only data about items being purchased and data about the occurrence of errors.

Figure 3:
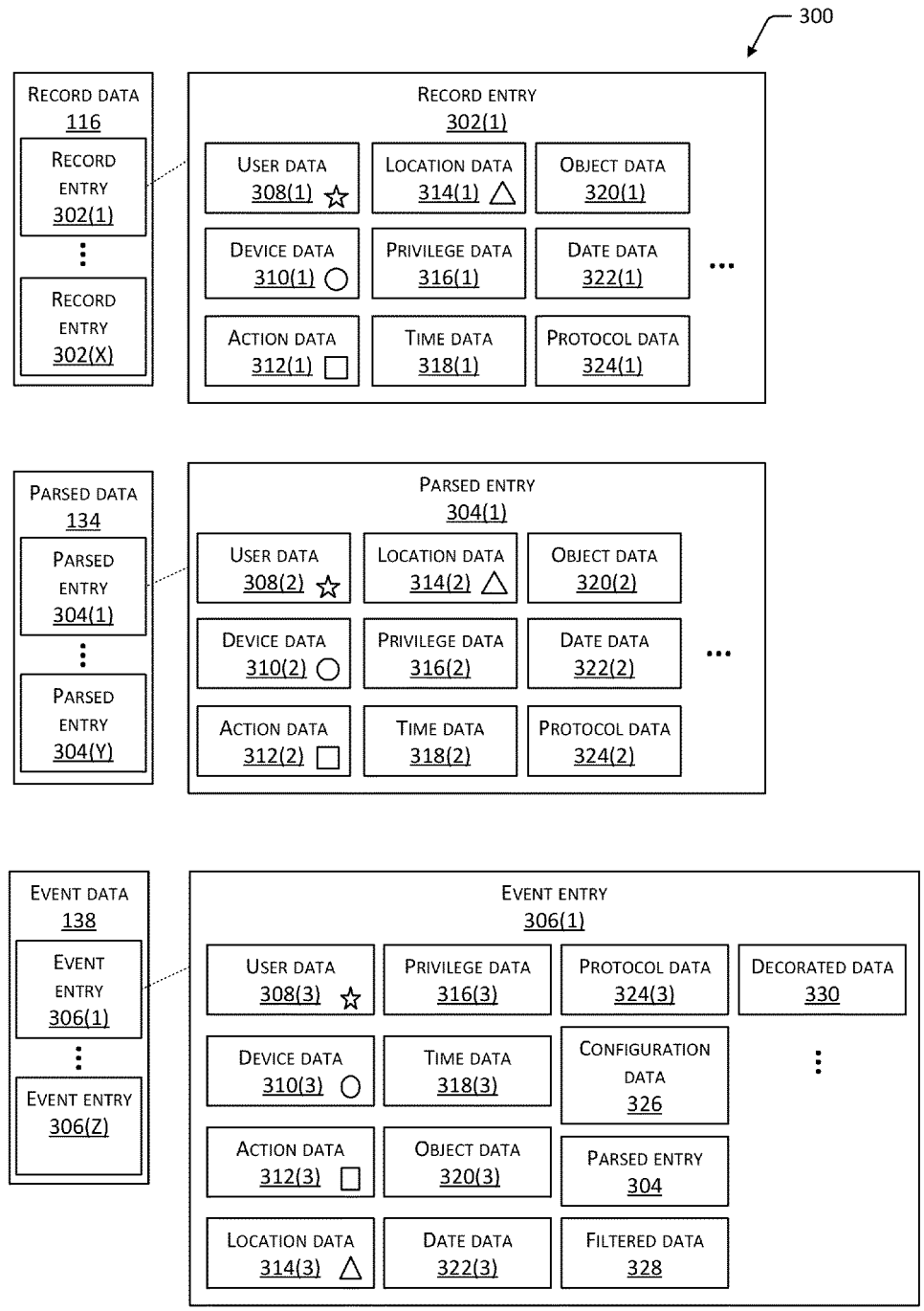
FIG. 3 illustrates examples of the record data, the parsed data, and the event data.

FIG. 3 illustrates examples of the record data 116, the parsed data 134, and the event data 138. The record data 116 may comprise a plurality of record entries. For example, the record data 116 may comprise record entry 302(1), . . . , 302(X). As illustrated in FIG. 3, the record entry 302(1) may comprise one or more of the following data: user data 308(1); device data 310(1); action data 312(1); location data 314(1); privilege data 316(1); time data 318(1); object data 320(1); date data 322(1); and protocol data 324(1).

The user data 308(1) may comprise information about a user. In one example, the user data 308(1) includes data representing a unique identifier associated with a user of a computing device. The unique identifier may represent a user that caused a computing device to perform an action, such as accessing a particular computing device, purchasing an item, and so forth.

The device data 310(1) may comprise information about a computing device. For example, the device data 310(1) may comprise at least one of data representing a unique identifier associated with the computing device, data identifying a computing device that performed a particular action, or data representing an IP address of the computing device.

The action data 312(1) may comprise information about a particular action that was performed. For example, the action data 312(1) may include at least one of data indicating a user has accessed a particular computing device, data indicating information was transferred to an unauthorized computing device, data indicating an item was purchased, or data indicating an occurrence of an error.

The location data 314(1) may comprise information about location. For example, the location data 314(1) may comprise information about the location of a computing device. The location data 314(1) may include geolocation data, which is indicative of a latitude and longitude of the computing device. The location data 314(1) may include geolocation data which is indicative of a latitude and longitude of the location in which a particular action was performed. For example, the location data 314(1) may indicate that a user accessed a particular computing device in a particular conference room.

The privilege data 316(1) may comprise information about events related to a modification of privileges. For example, the privilege data 316(1) may indicate that a user was granted access to a particular document. The time data 318(1) may comprise information about time. The time data 318(1) may represent when an event occurred, when a particular record data 116 was generated, and so forth. The object data 320 may comprise information about an object that a computing device is performing an action on. For example, the object data 320 may identify a particular document that is being modified. The date data 322 may comprise information about the date that an event occurred. The protocol data 324 may comprise data about a transmission protocol which was used to send the record data 116.

The parsed data 134 may be described as transformed or otherwise processed record data 116. The parsed data 134 may include a plurality of parsed entries. For example, the parsed data 134 may include parsed entries 304(1), . . . , 304(Y). As illustrated in FIG. 3, the parsed entry 304(1) may comprise one or more of the following data: user data 308(2); device data 310(2); action data 312(2); location data 314(2); privilege data 316(2); time data 318(2); object data 320(2); date data 322(2); and protocol data 324(2).

The event data 138 may be described as transformed or otherwise processed parsed data 134. The event data 138 may include a plurality of event entries. For example, the event data 138 may include event entries 306(1), . . . , 306(Z). As illustrated in FIG. 3, the event entry 306(1) may comprise one or more of the following data: user data 308(3); device data 310(3); action data 312(3); location data 314(3); privilege data 316(3); time data 318(3); object data 320(3); date data 322(3); and protocol data 324(3).

The event entry 306(1) may include configuration data 326 comprising information about configuring a computing device. For example, the event entry 306(1) may comprise data which causes the sink node 106 to provide one of a plurality of web pages to a media device.

The event entry 306(1) may include filtered data 328. The filtered data 328 may be described as data which has been processed by the filter module 140. The event entry 306(1) may include decorated data 330. The decorated data 330 may be described as data which has been processed by the decorate module 142.

Figure 4:
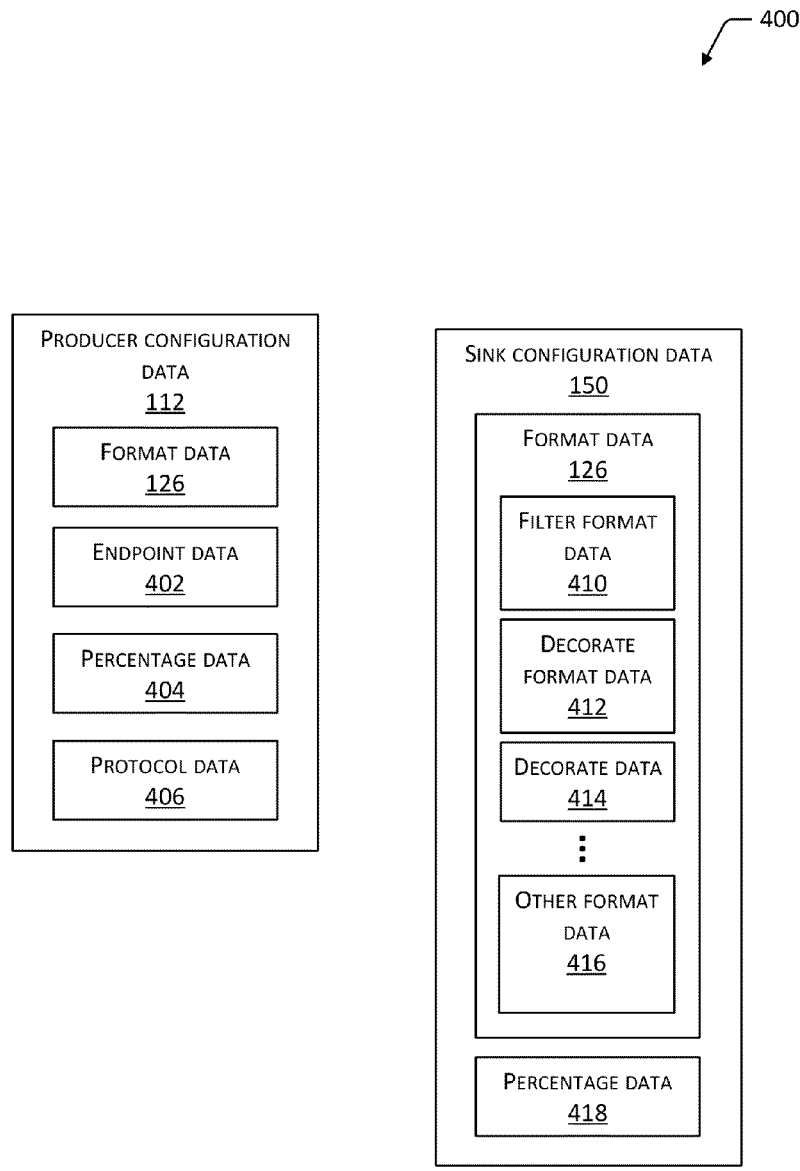
FIG. 4 illustrates examples of producer configuration data and sink configuration data.

FIG. 4 illustrates examples of the producer configuration data 112 and the sink configuration data 150. The producer configuration data 112 may be described as data used to configure the producer node 104. As illustrated in FIG. 4, the producer configuration data 112 may include at least one of the format data 126, endpoint data 402, percentage data 404, or protocol data 406. The format data 126 may comprise data which causes the producer node 104 to generate the record data 116 by applying the format data 126, which is discussed in more detail below with regard to FIG. 8.

The endpoint data 402 may comprise data which causes the producer node 104 to provide the record data 116 to the processing system node 102. The percentage data 404 may comprise data which causes the producer node 104 to provide a portion of the record data 116 to the processing system node 102. The portion of the record data 116 may be a designated percentage of a random sample of the record data 116. For example, the portion may be the first twenty percent, or the last twenty percent of a random sample of the record data 116. In another example, the portion of the record data 116 may be determined based on intervals. For example, the producer node 104 may provide every other generated record data 116 or every third generated record data 116.

The protocol data 406 may comprise data which causes the producer node 104 to provide the record data 116 to the processing system node 102 using a designated communications protocol. The designated protocol may include Transmission Control Protocol, User Datagram Protocol, and so forth.

The sink configuration data 150 may be described as data used to configure the processing system node 102. The sink configuration data 150 may include information which indicates which producer nodes 104 to receive information from. In one example, at a first point in time, the sink configuration data 150 includes information which causes the processing system node 102 to provide data from a first producer node 104 and a second producer node 104. Thereafter, the sink configuration data 150 may include information which causes the processing system node 102 to no longer provide event data 138 using information from the first producer node 104.

The sink configuration data 150 may include format data 126. The format data 126 may comprise data about configuring the processing system node 102 to format the parsed data 134. The format data 126 may include at least one of filter format data 410, decorate format data 412, decorate data 414, or other format data 416.

The filter format data 410 may comprise data which causes the processing system node 102 to filter or remove at least a portion of the parsed data 134. The decorate format data 412 may comprise data which causes the processing system node 102 to decorate the parsed data 134. The decorate data 414 may comprise data which is used by the decorate module 142 to decorate the record data 116. The other format data 416 may comprise various data. For example, the other format data 416 may comprise data which causes the processing system node 102 to reorder the parsed data 134.

The sink configuration data 150 may include percentage data 418. The percentage data 418 may be configured to cause the processing system node 102 to provide a portion of the generated parsed data 134. For example, an administrative user may operate with the sink node 106 and enter in a value of "50 percent". Based on the entered value of "50 percent", the sink node 106 may generate the percentage data 418, which includes the value of "50 percent", and provide the percentage data 418 to the processing system node 102. Using the value of "50 percent", the processing system node 102 may provide every other generated parsed data 134 to the sink node 106, resulting in fifty percent of the parsed data 134 being provided.

As described above, the format data 126 may be generated based on user input. In some implementations, the format data 126 may not be generated based on user input. For example, a particular sink node 106 may determine that an amount of event data 138 being received is too large for the sink node 106 to process. Based on this determination, the sink node 106 may automatically generate format data 126 which causes the processing system node 102 to provide less event data 138. In another example, the format data 126 may be generated based on machine learning. For example, a first sink node 106 may generate the format data 126 in response to a determination by a second sink node 106 that a need exits to start including new information. The second sink node 106 may provide data to the first sink node 106, which causes the first sink node 106 to automatically generate the format data 126.

Figure 5:
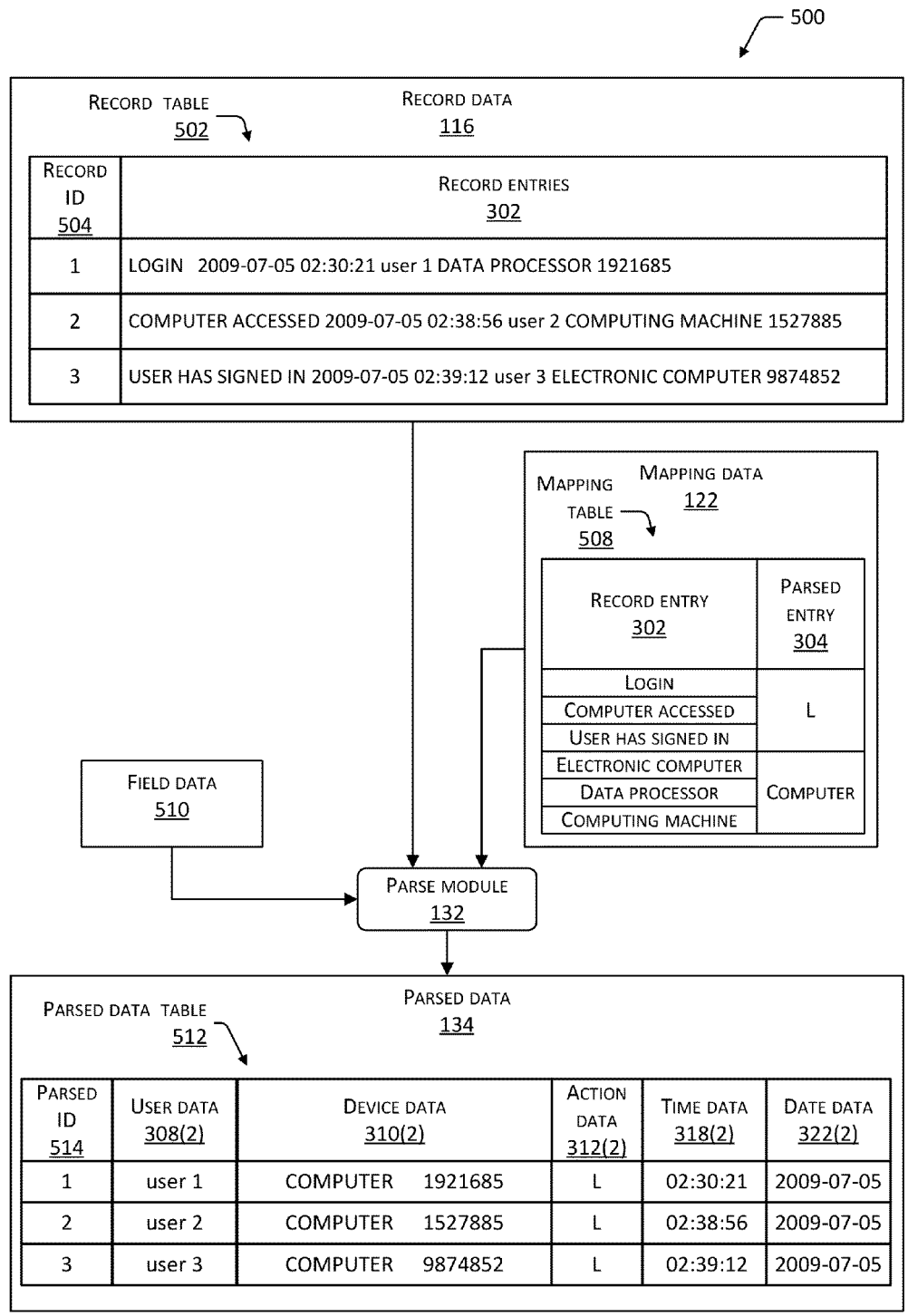
FIG. 5 is a block diagram of a parse module generating the parsed data by associating record entries to parsed entries.

FIG. 5 is a block diagram 500 of the parse module 132 generating the parsed data 134 by associating record entries 302 to parsed entries 304. The record data 116 includes a record table 502, which includes data characterized as being organized in columns and rows. The rows of the record table 502 represent records associated with record IDs 504.

The records include the record entries 302. The record associated with record ID 504 "1" comprises the following six record entries 302: 1) "LOGIN"; 2) "2009-07-05"; 3) "02:30:21"; 4) "user 1"; 5) "DATA PROCESSOR"; and 6) "1921685". The record associated with record ID 504 "2" comprises the following six record entries 302: 1) "COMPUTER ACCESSED"; 2) "2009-07-05"; 3) "02:38:56"; 4) "user 2"; 5) "COMPUTING MACHINE"; and 6) "1527885". The record associated with record ID 404 "3" comprises the following six record entries 302: 1) "USER HAS SIGNED IN"; 2) "2009-07-05"; 3) "02:39:12"; 4) "user 3"; 5) "ELECTRONIC COMPUTER"; and 6) "9874852".

The mapping data 122 includes a mapping table 508, which includes data characterized as being organized in columns and rows. The columns of the mapping table 508 include the following fields: record entry 302 and parsed entry 304. The parsed entries 304 in the mapping table 508 include the following values: "L"; and "COMPUTER".

In FIG. 5, the parse module 132 generates the parsed data 134 by mapping the record entries 302 to the parsed entries 304. For example, the parse module 132 maps the record entry 302 "Login" to the parsed entry 304 "L". The parse module 132 also maps the record entry 302 "Computer accessed" to the parsed entry 304 "L", and the record entry 302 "User has signed in" to the parsed entry 304 "L". Using field data 510, the parse module 132 assigns the record entries 302 to designated fields as shown in a parsed data table 512. The field data 510 may comprise information about assigning the record entries 302 to designated fields.

The parsed data 134 may include the parsed data table 512, which includes data characterized as being organized in columns and rows. The parsed data table 512 includes the following six fields: parsed ID 514; user data 308(2); device data 310(2); action data 312(2); time data 318(2); and date data 322(2). In FIG. 5, the parse module 132 reorganizes the input data. For example, as shown in FIG. 5, when viewed from left to right, the data of the parsed data table 512 has a different order than the data of the record data table 502.

Figure 6:
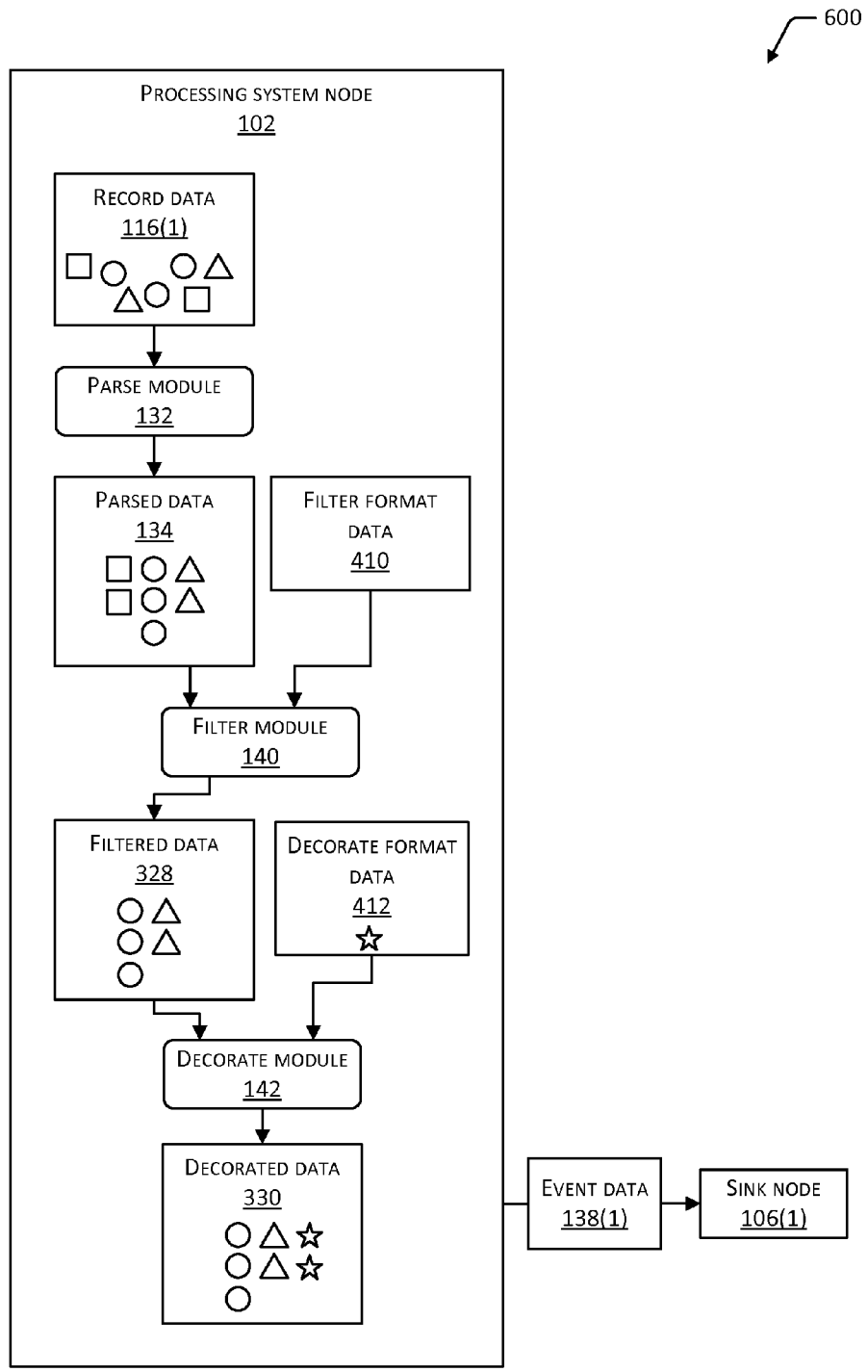
FIG. 6 is a block diagram of a processing system node configured to generate filtered data and decorated data from the record data.

FIG. 6 is a block diagram 600 of a system configured to generate the filtered data 328 and the decorated data 330 from the record data 116. The parse module 132 generates the parsed data 134 using the record data 116(1). The record data 116(1) includes a plurality of record entries 302 illustrates as different shapes. The different shapes include two square record entries 302, three circle record entries 302, and two triangle record entries 302. Once the parsed data 134 is generated from the record data 116(1), the filter module 140 generates the filtered data 328 using the parsed data 134 and the filter format data 410 as inputs. The filter format data 410 comprises information which causes the filter module 140 to remove the square record entries 302 from the record data 116(1).

Once the filtered data 328 is generated, the decorate module 142 generates the decorated data 330 using the filtered data 328 and the decorate format data 412. The decorate format data 412 comprises information which adds other information to the filtered data 328. The other information is illustrated in the decorated data 330 as star shapes. The other information may comprise any suitable data. For example, the other information may comprise text data representative of a location. The added text data may be determined based on an IP address included in the filtered data 328.

In FIG. 6, the processing system node 102 provides the event data 138(1) to the sink node 106(1). The event data 138(1) may comprise the decorated data 330. The sink node 106(1) may use the event data 138(1) to perform one or more computational tasks.

In some implementations, the parse module 132 is configured to provide the parsed data 134 to more than one of the processing modules 136, which are configured to generate different formatted data by applying different format data 126 to the parsed data 134 after applying the format data 126. These different generated formatted data may then be provided to other processing modules 136 for further processing. Such a configuration may be visualized as a hierarchical construction, which may increase the efficiency of the processing system node 102. Efficiency may be increased because different sink nodes 106 that would perform most of the same or similar processing of record data 116 to generate the event data 138 may not need to perform the same processing multiple times. That is, the root of the hierarchy is processed once for all leaf nodes, and each level below the root is processed once, as needed for the leaf node. In complex cases, such a configuration may reduce a large amount of processing time.

Figure 7:
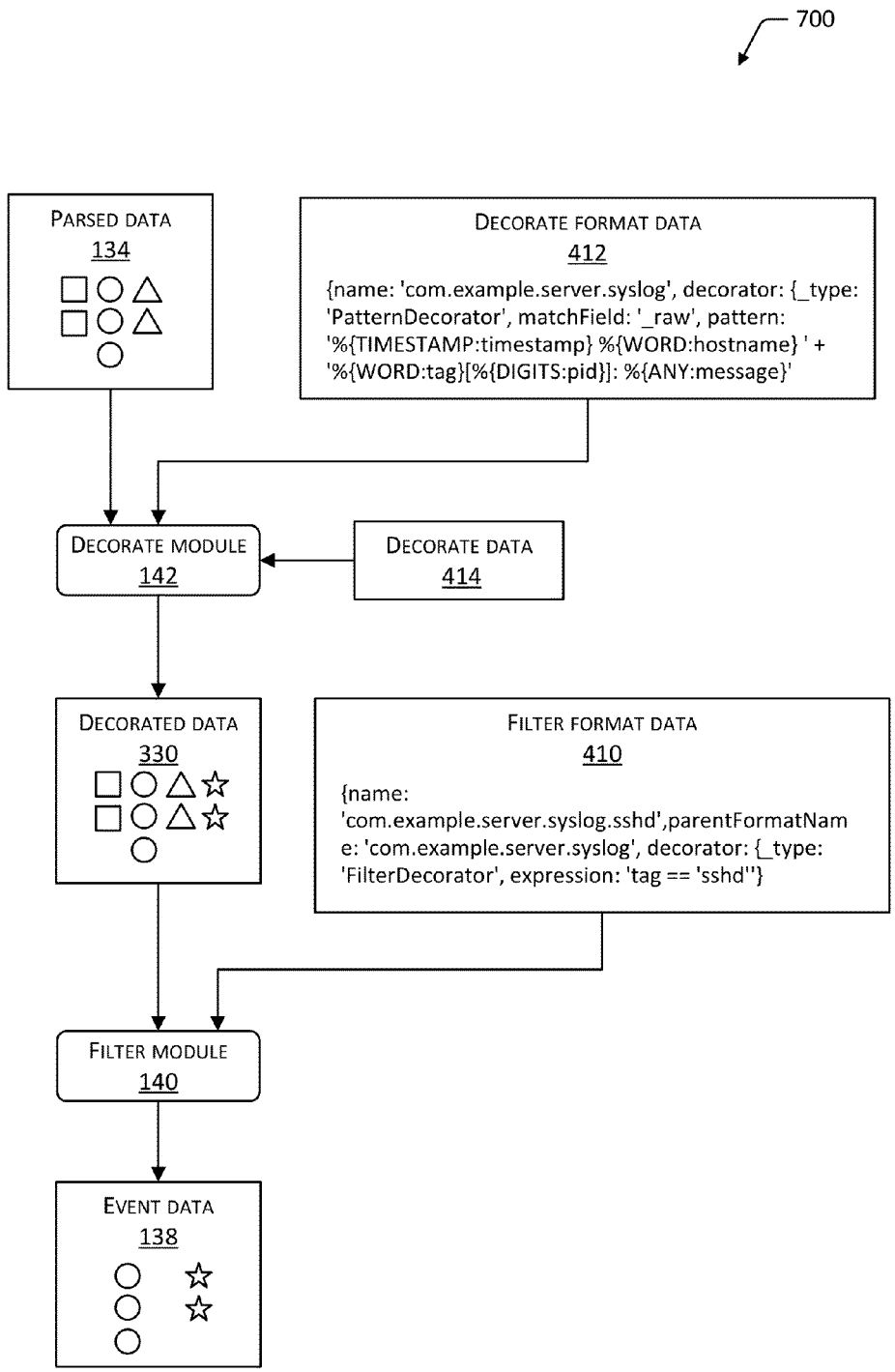
FIG. 7 is a block diagram of a filter module generating the event data using the decorated data and filter format data.

FIG. 7 is a block diagram of the filter module 140 generating the event data 138 using the decorated data 330 and the filter format data 410. The decorate module 142 generates the decorated data 330 using the parsed data 134, the decorate format data 412, and the decorate data 414. The parsed data 134 comprises parsed entries 304 illustrated as different shapes. The parsed entries 304 are illustrated as two squares, three circles, and two triangles. As discussed above, the parsed entries 304 may be described as transformed or otherwise processed record entries 302.

As illustrated in FIG. 7, the decorate format data 412 comprises expression language data, which causes the decorate module 142 to decorate the parsed data 134 based on the expression language. The decorate format data 412 may be generated based on user input from, for example, an administrative user associated with the sink node 106. As discussed above, the decorate data 414 may comprise information which is added to the parsed data 134. In FIG. 7, the information added to the parsed data 134 is illustrated as having star shapes. That is, as shown in the decorated data 330, information has been added and is illustrated as stars. These star shapes may be described as parsed entries 304.

Once the decorated data 330 is generated, the filter module 140 generates the event data 138 using the decorated data 330 and the filter format data 410. As illustrated in FIG. 7, the filter format data 410 comprises expression language data that causes the filter module 140 to filter the decorated data 330 based on the expression language. The filter format data 410 may be generated based on user input from, for example, an administrative user associated with the sink node 106. As shown in FIG. 7, the filter module 140 removes the square parsed entries 304 and the triangle parsed entries 304, resulting in event data 138 that comprises event entries 306 illustrated as three circles and two stars.

Figure 8:
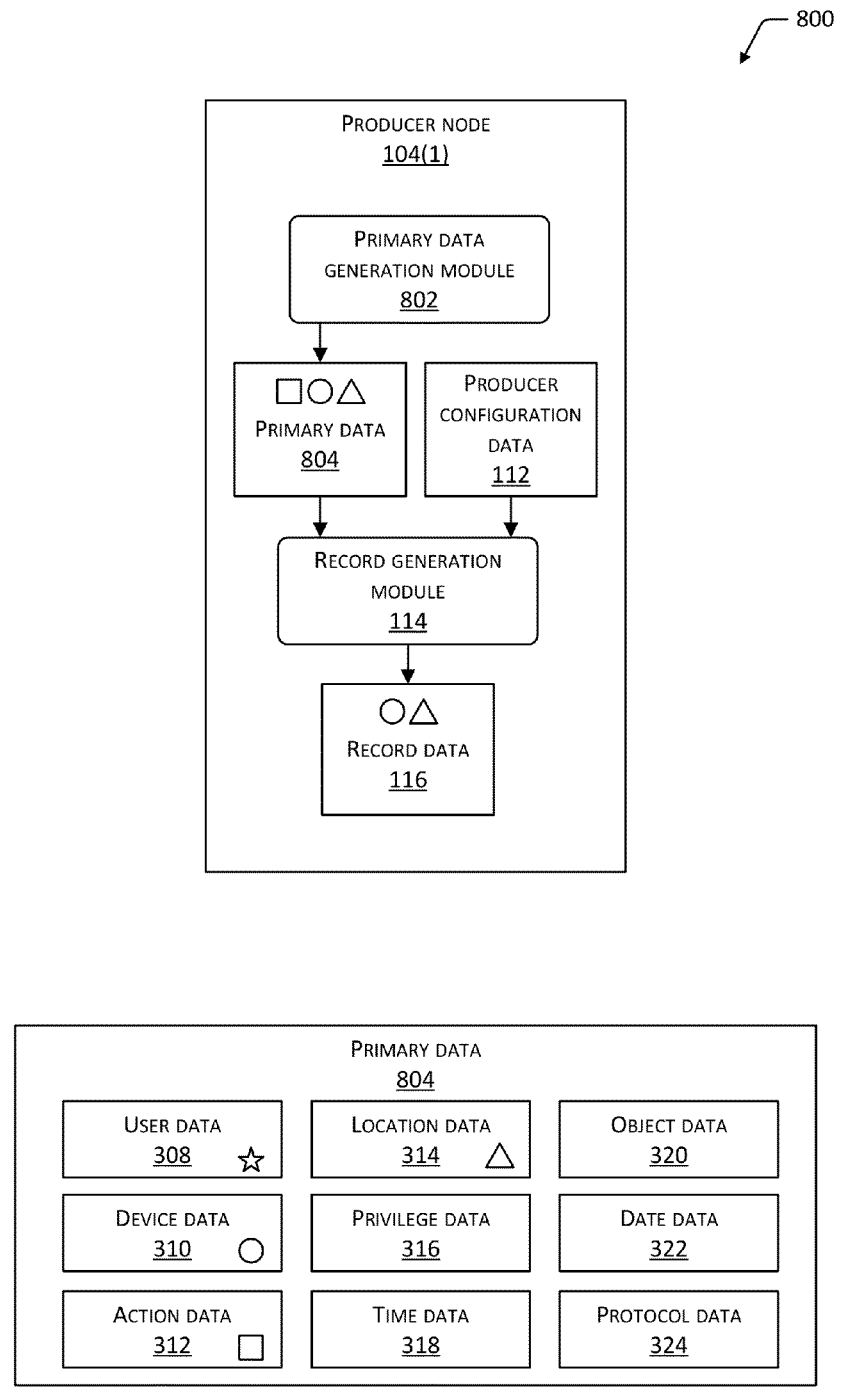
FIG. 8 is a block diagram of the producer node generating record data based on primary data and illustrates an example of the primary data.

FIG. 8 is a block diagram 800 of the producer node 104(1) generating the record data 116 based on primary data. FIG. 8 also illustrates an example of the primary data 804.

The producer node 104(1) may include a primary data generation module 802 configured to generate primary data 804. The primary data 804 may comprise information about one or more activities associated with the producer node 104(1).

The record data 116 may be described as transformed or otherwise processed primary data 804. As illustrated in FIG. 8, the primary data 804 may comprise one or more of the following data: user data 308; device data 310; action data 312; location data 314; privilege data 316; time data 318; object data 320; date data 322; and protocol data 324.

In FIG. 8, the record generation module 114 generates the record data 116 using the primary data 804 and the producer configuration data 112. In this example, the primary data generation module 802 causes the record generation module 114 to remove information. The information removed from the primary data 804 is illustrated as a square shape. This information may comprise various information. For example, the information removed may include information about a user, information about a device, information about an action, and so forth. The primary data generation module 802 may be configured to perform similar or the same functions as the parse module 132 or the processing module 136. For example, the primary data generation module 802 may apply format data 126 to the primary data 804. Additionally, the primary data generation module 802 generates the record data 116 by converting the primary data 804 based on mapping data 122. In another example, the record generation module 114 may reorder the primary data 804 based on the producer configuration data 112.

The primary data generation module 802 may provide various benefits. For example, efficiency of the processing system node 102 may improve because the processes performed by the primary data generation module 802 may reduce the amount of data transferred from the producer node 104 to the processing system node 102. In addition, the processes performed by the primary data generation module 802 may reduce the amount of resources (e.g., servers, computing nodes, and so forth) needed at the processing system node 102 to process data received from the producer node 104 because the producer node 104 has already processed the data.

Figure 9:
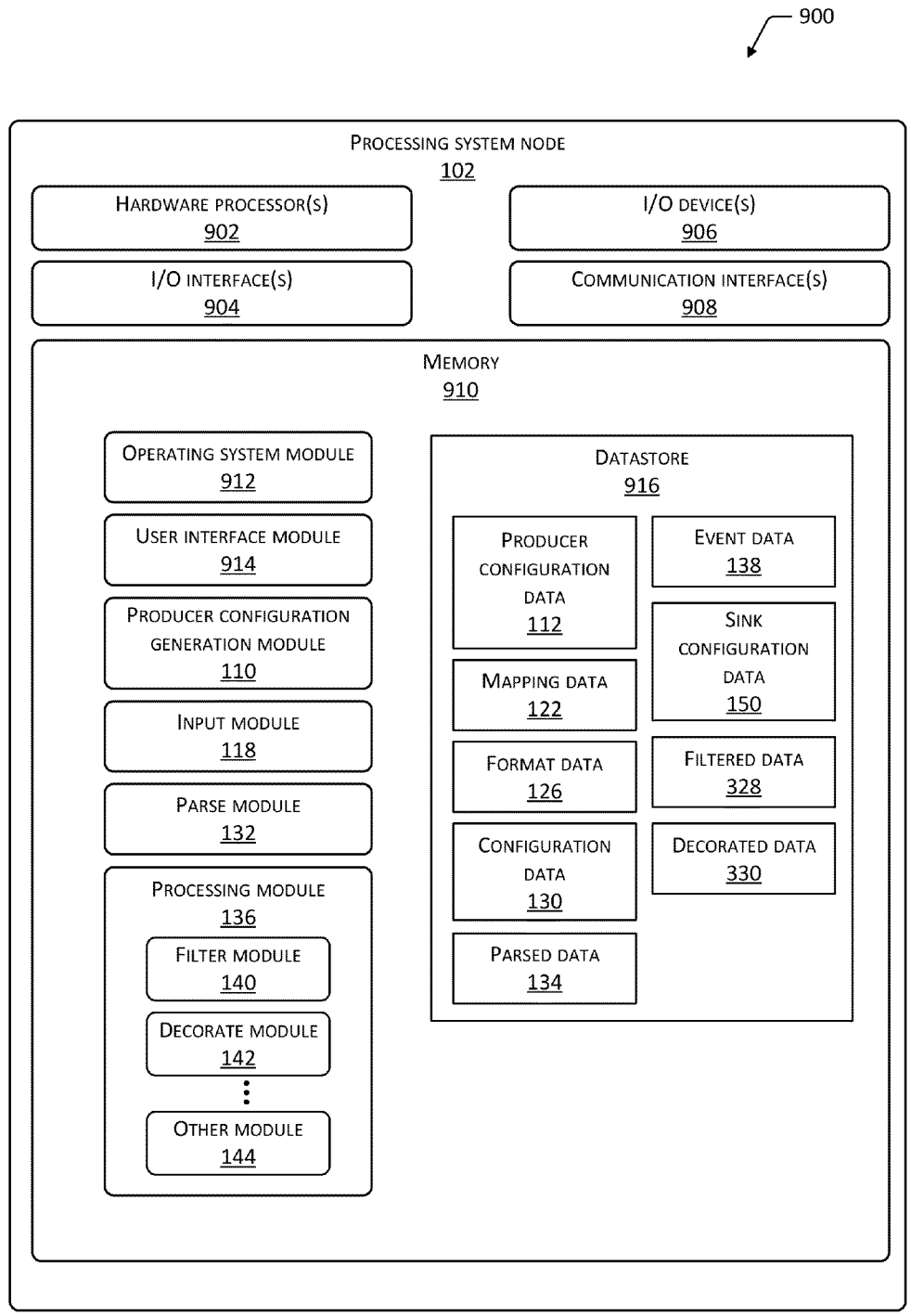
FIG. 9 is a block diagram of the processing system node configured to generate parsed data.

FIG. 9 is a block diagram of the processing system node 102 configured to generate the parsed data 134. The processing system node 102 may include at least one hardware processor 902 configured to execute stored instructions. The at least one hardware processor 902 may comprise one or more cores.

The processing system node 102 includes at least one input/output ("I/O") interface 904 that enables portions of the processing system node 102 (e.g., the hardware processor 902) to communicate with other devices. The I/O interface 904 may include Inter-Integrated Circuit ("I2C"), Serial Peripheral Interface bus ("SPI"), Universal Serial Bus ("USB"), RS-232, HDMI, TOSLINK®, Bluetooth®, and so forth. The at least one I/O interface 904 may be coupled to at least one I/O device 906. In some implementations, certain I/O devices 906 are physically incorporated with the processing system node 102 or externally placed.

The processing system node 102 may include at least one communication interface 908. The communication interface 908 may be configured to provide communications between the processing system node 102 and other devices, such as servers, routers, access points, and so forth. The communication interface 908 may connect to a network.

The processing system node 102 may include at least one bus or other internal communications hardware or software that enables for the transfer of data between the various modules and components of the processing system node 102.

As illustrated in FIG. 9, the processing system node 102 may include at least one memory or memory device 910. The memory 910 may comprise one or more non-transitory computer-readable storage media ("CRSM"). The CRSM may include at least one of an electronic storage medium, a magnetic storage medium, an optical storage medium, a quantum storage medium, a mechanical computer storage medium, and so forth. The CRSM may comprise primary system memory or secondary system memory. Primary system memory is online, readily accessible storage that may be accessed with little or no latency. For example, primary system memory may include random access memory ("RAM"), flash memory, and so forth. In comparison, secondary system memory may be accessed with latency greater than the primary system memory. For example, the secondary system memory may include spinning magnetic media, magnetic tape, and so forth. The memory 910 may store computer readable instructions, data structures, program modules, and other data for the operation of the processing system node 102.

The memory 910 may include at least one operating system ("OS") module 912. The OS module 912 may be configured to manage hardware resources such as the I/O interface 904, the I/O devices 906, the communication interfaces 908, and provide various services to applications or modules executing on the hardware processor 902. The memory 910 may also store at least one of the following modules, which may be executed as foreground applications, background tasks, daemons, and so forth.

The memory 910 may include a user interface module 914. The user interface module 914 may be configured to provide a user interface to a user using the I/O devices 906 and to accept inputs received from the I/O devices 906. The user interface may include one or more visual, audible, or haptic elements. For example, the user interface may be configured to provide a graphic user interface, an audible user interface, and so forth.

As discussed above, the producer configuration generation module 110 may generate the producer configuration data 112. In some implementations, the producer configuration generation module 110 generates the producer configuration data 112 based on user input. The producer configuration generation module 110 may enable a user to operate with the processing system node 102 to enter the producer configuration data 112.

The input module 118 may be configured to receive different record data 116 from different producer nodes 104(P). For example, the input module 118 may receive the record data 116(1) from the producer node 104(1) and the record data 116(2) from the producer node 104(P).

As discussed above, the parse module 132 may generate the parsed data 134. The parse module 132 may generate the parsed data 134 by transforming the record data 116 based on various processes. For example, the parse module 132 may convert the record entries 302 into parsed entries 304 based on the mapping data 122. In another example, the parse module 132 may generate the parsed data 134 by reordering the record entries 302.

As discussed above, although the example illustrated in FIG. 9 illustrates the processing system node 102 having one parse module 132, the processing system node 102 may have more than one parse module 132 configured to generate parsed data 134. In some implementations, the different parse modules 132 are configured to handle different record data 116. These different parse modules 132 may be optimized to handle different record data 116.

The processing module 136 may include various modules used to generate the event data 138. In FIG. 9, the processing module 136 includes the filter module 140, the decorate module 142, and the other module 144.

In some implementations, the memory 910 includes a datastore 916 for storing information. The datastore 916 may use a flat file, database, linked list, code, tree, or other data structure to store the information. The datastore 916 may comprise the primary system memory, which may include random access memory, flash memory, and so forth. In other implementations, the datastore 916 may comprise the secondary system memory. In some implementations, the datastore 916, or a portion thereof, may be distributed across at least one other device, such as another server, a network storage device, and so forth. As illustrated in FIG. 9, the datastore 916 may include the producer configuration data 112, the mapping data 122, the format data 126, the configuration data 130, the parsed data 134, the event data 138, the sink configuration data 150, the filtered data 328, and the decorated data 330.

Figure 10:
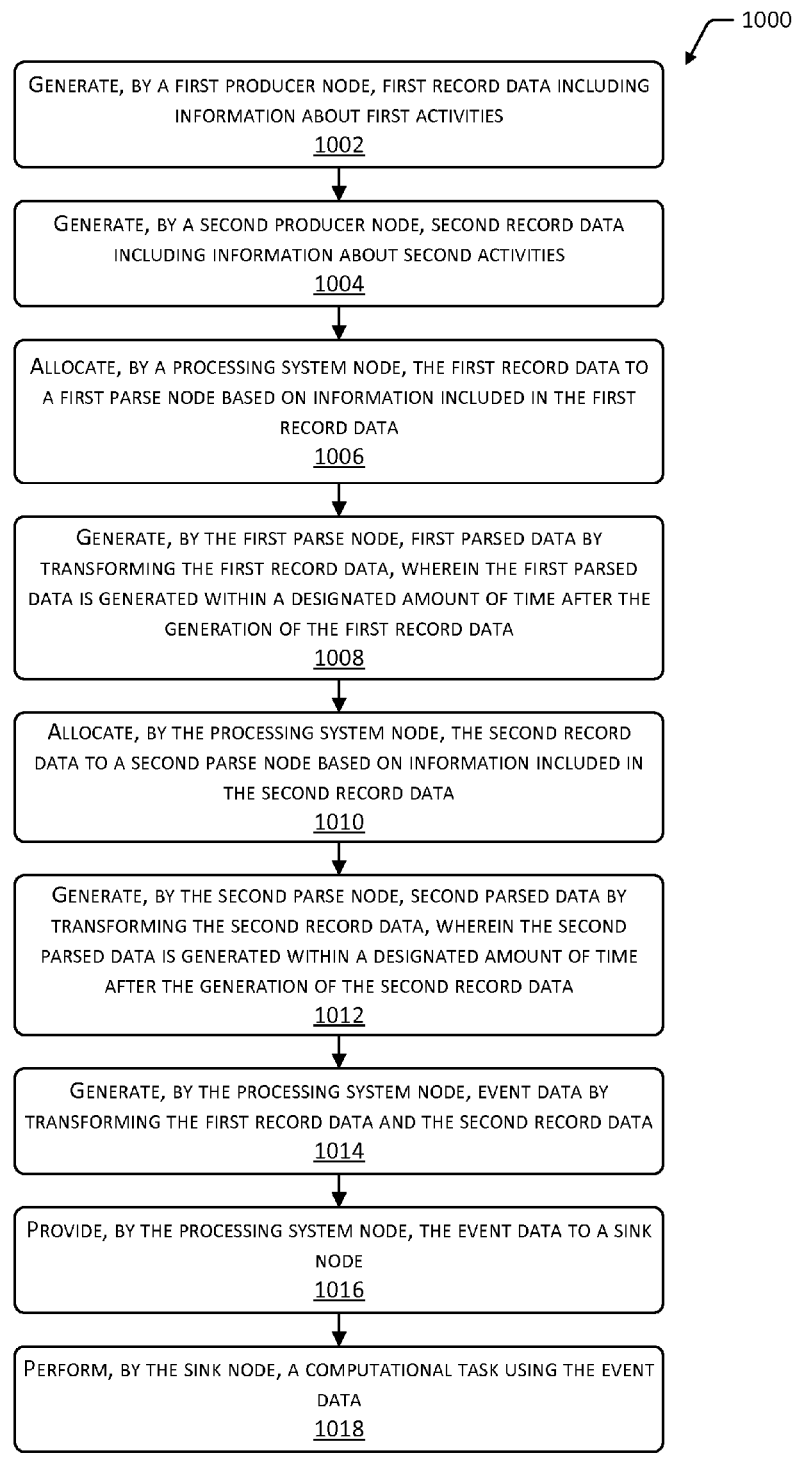
FIG. 10 is a flow diagram illustrating a process of allocating separate record data to separate sink nodes to generate parsed data.

FIG. 10 is a flow diagram illustrating a process 1000 of allocating different record data 116 to different parse modules 132 to generate the parsed data 134. The processing system node 102, the producer nodes 104(1) and 104(P), and the sink nodes 106(1) and 106(S) may implement the process 1000. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At block 1002, the producer node 104 generates first record data 116 including information about first activities. For example, the producer node 104(1) may generate the record data 116(1). The record data 116(1) may include information indicating that a computing device has been accessed, data indicating that information was transferred to a computing device, data indicating an occurrence of an error, and so forth.

In some implementations, the producer node 104 generates the first record data 116 based on the producer configuration data 112. The producer configuration data 112 may comprise information about configuring the producer node 104. In some implementations, the processing system node 102 enables a user (e.g., an administrative user) to operate an input device of the processing system node 102 to generate the producer configuration data 112. The producer configuration data 112 may cause the producer node 104 to provide the record data 116 to the processing system node 102 using a specified transmission protocol. The producer node 104 may generate the record data 116 using the primary data 804. The primary data 804 may comprise information about one or more activities performed by the producer node 104.

At block 1004, the producer node 104 generates second record data 116 including information about second activities. For example, the producer node 104(P) may generate the record data 116(2). The record data 116(2) may be different in layout, composition, or encoding from the record data 116(1).

At block 1006, the processing system node 102 allocates the first record data 116 to a first parse node based on information included in the first record data 116. The information included in the first record data 116 may comprise header data indicating a type of data of the first record data 116. The first parse node may comprise one of a plurality of parse modules 132.

At block 1008, the first parsed node generates first parsed data 134 by transforming the first record data 116. The first parsed data 134 is generated within a designated amount of time after the generation of the first record data 116. The designated amount of time may be equal to or less than 20 seconds.

At block 1010, the processing system node 102 allocates the second record data 116 to the second parse node based on information included in the second record data 116. The information included in the second record data 116 may comprise header data indicating a type of data of the second record data 116.

At block 1012, the second parse node generates second parsed data 134 by transforming the second record data 116. The second parsed data 134 may be generated within a designated amount of time after the generation of the second record data 116. In some implementations, the first parse node and the second parse node are configured to generate parsed data 134 contemporaneously.

At block 1014, the processing system node 102 generates event data 138 by transforming the first record data 116 and the second record data 116. For example, the processing system node 102 may generate event data 138(1) by transforming the record data 116(1) and the record data 116(2).

In some implementations, the processing system node 102 generates the event data 138 based on sink configuration data 150. The sink configuration data 150 may comprise various data. For example, the sink configuration data 150 may comprise the endpoint data representing a request for the processing system node 102 to provide the event data 138 to the sink node 106. The sink configuration data 150 may comprise the percentage data 418 representing a request for the processing system node 102 to provide a percentage of the event data 138 to the sink node 106. The sink configuration data 150 may comprise the format data 126 comprising information about configuring the processing system node 102 to format the event data 138. The sink configuration data 150 may be generated by the sink node 106 or a separate computing device communicatively coupled to the processing system node 102.

At block 1016, the processing system node 102 provides the event data 138 to the sink node 106. The processing system node 102 may provide the event data 138 to a plurality of sink nodes 106.

At block 1018, the sink node 106 performs a computational task using the event data 138. In one example, the performance of the computational task includes determining that a user has been granted access to a particular document and generating alarm data indicating that the user has been granted access to the particular document. In another example, the performance of the computational task includes determining that information was transferred to an unauthorized computing device and generating alarm data indicating that the information was transferred to the unauthorized computing device.

Figure 11:
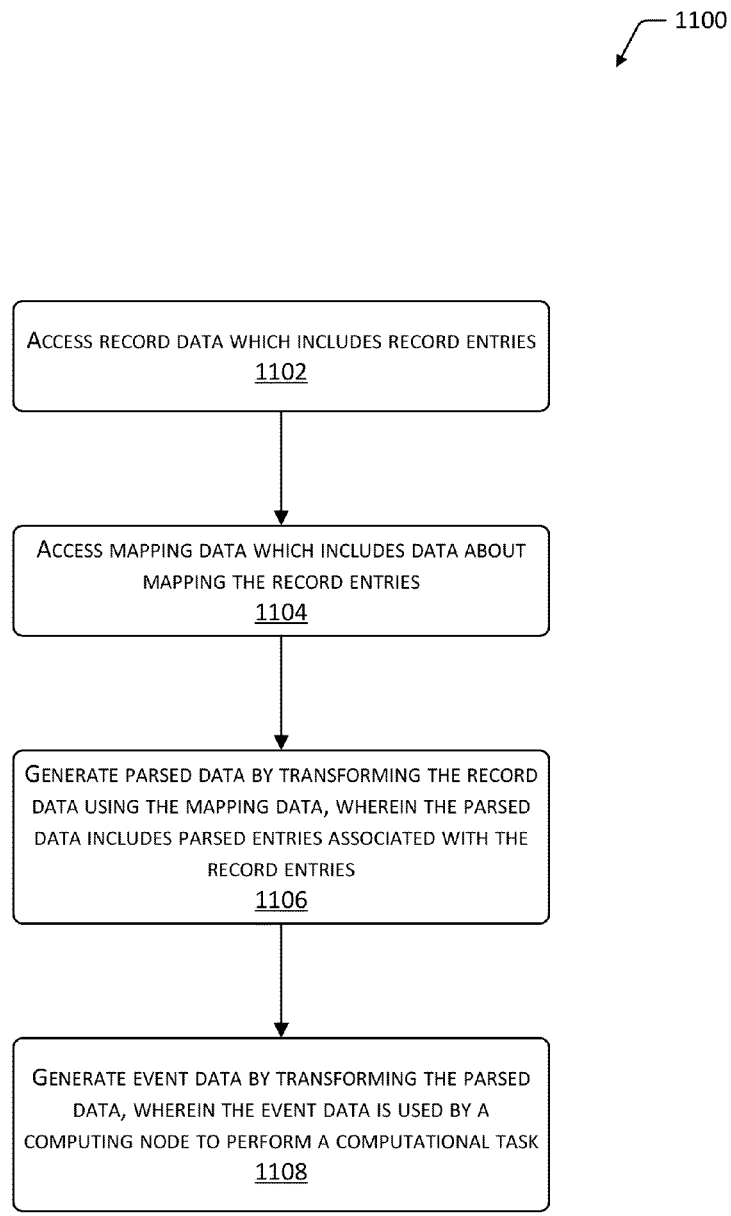
FIG. 11 is a flow diagram illustrating a process of generating parsed data by transforming the record data using the mapping data.

FIG. 11 is a flow diagram illustrating a process 1100 of generating parsed data 134 by transforming the record data 116 using mapping data 122. The processing system node 102 may implement the process 1100. Although the process 1100 is described with reference to the flowchart illustrated in FIG. 11, many other methods performing the acts associated with the process 1100 may be used. For example, the order of the steps may be changed, some of the steps described may be optional, and additional steps may be included.

At block 1102, the processing system node 102 accesses record data 116 which includes record entries 302. The record entries 302 may comprise various data and may be expressed differently. For example, the record entries 302 may comprise text-based log data or a human-readable log file. The human-readable log file may comprise information that can be naturally read by humans. The record entries 302 may indicate that a computing device has been accessed, may indicate that information was transferred to an unauthorized computing device, may indicate an item was purchased, may indicate an occurrence of an error, and so forth. The processing system node 102 may comprise one or more computing devices that have one or more hardware processors and one or more memory devices communicatively coupled to the one or more hardware processors. At block 1104, the processing system node 102 accesses mapping data 122, which includes data about mapping the record entries 302.

At block 1106, the processing system node 102 generates parsed data 134 by transforming the record data 116 using the mapping data 122. The parsed data 134 may include parsed entries 304 associated with the record entries 302. In some implementations, the parsed data 134 is generated within a designated amount of time after the generation of the record data 116. The designated amount of time may comprise fifteen seconds. In some implementations, the transformation of the record data 116 using the mapping data 122 includes converting the record data 116 to a markup language. In some implementations, the transformation of the record data 116 using the mapping data 122 includes converting the first record entry 302 to a first parsed entry 304, and converting the second record entry 302 to a second parsed entry 304. The parsed data 134 may indicate that a computing device has been accessed, may indicate that information was transferred to an unauthorized computing device, may indicate an item was purchased, may indicate an occurrence of an error, and so forth. In some implementations, the transformation of the record data 116 using the mapping data 122 includes changing an order of the first record entry 302 and the second record entry 302. The transformation of the record data 116 using the mapping data 122 may further include converting the record data 116 such that the first record entry 302 and the second record entry 302 conform to a designated standard. In some implementations, the parsed data 134 is generated by filtering the first record entry 302 from the record data 116 such that the first record entry 302 is removed from the record data 116. The parsed data 134 may further be generated by decorating the second record entry 302 by supplementing the second record entry 302 with other information such as the decorate data 414.

At block 1108, the processing system node 102 generates event data 138 by transforming the parsed data 134. The event data 138 may be used by a computing node to perform a computational task. For example, the event data 138(1) may be used by the sink node 106(1) to determine whether a user has incorrectly accessed a piece of content. The event data 138 may be described as record data 116 that has been parsed, filtered, and mapped. Computing nodes may process the event data 138 more efficiently when compared to processing the record data 116. In some implementations, the event data 138 may be described as being more machine readable when compared to the record data 116.

In some implementations, the processing system node 102 determines whether the parsed data 134 is generated within a designated amount of time (e.g., fifteen seconds) after a generation of the record data 116. If the processing system node 102 determines that the parsed data 134 is not generated within the designated amount of time, the processing system node 102 may cause additional resources (e.g., additional computing devices) to operate in cooperation with the processing system node 102 such that subsequently generated parsed data 134 is generated within the designated amount of time. In some implementations, once the determination is made, the processing system node 102 provides producer configuration data 112 comprising information that causes the producer node 104 to provide generated record data 116 to the computing node operating in cooperation with the processing system node 102. The computing node operating in cooperation with the processing system node 102 may be located within the processing system node 102. The designated amount of time may be determined based on a percentage. For example, for a system which requires the parsed data 134 or the event data 138 to be generated within twenty seconds, if the processing system determines that the parsed data 134 or the event data 138 will be generated in at least sixteen seconds (i.e., eighty percent of twenty seconds), the processing system node 102 may be configured to cause the computing node to operate in cooperation with the processing system node 102.

Figure 12:
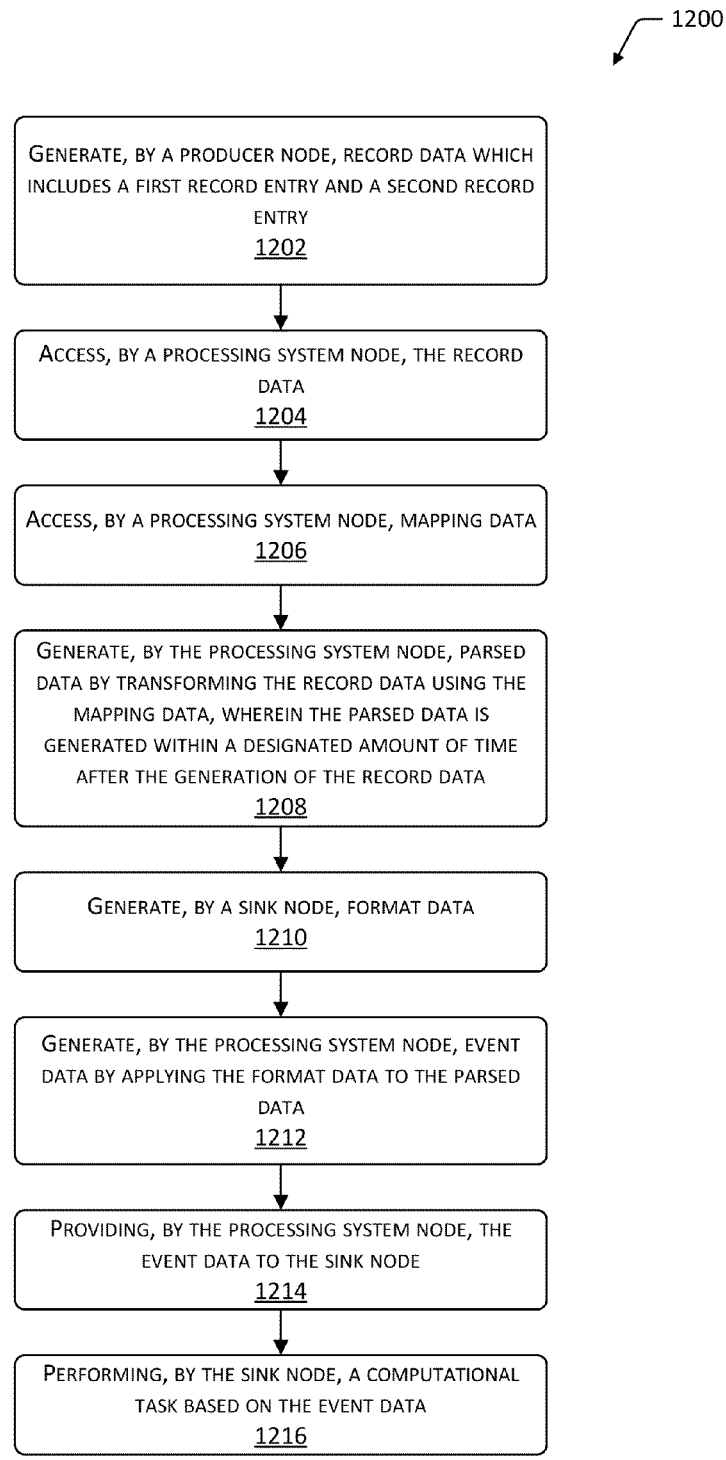
FIG. 12 is a flow diagram illustrating a process of different computing nodes performing different functions to generate event data by applying format data to parsed data.

FIG. 12 is a flow diagram illustrating a process 1200 of different computing nodes performing different functions to generate event data 138 by applying format data 126 to parsed data 134. The processing system node 102, the producer nodes 104(1) and 104(P), and the sink nodes 106(1) and 106(S) may implement the process 1200. Although the process 1200 is described with reference to the flowchart illustrated in FIG. 12, many other methods performing the acts associated with the process 1200 may be used. For example, the order of the steps may be changed, some of the steps described may be optional, and additional steps may be included.

At block 1202, the producer node 104 generates record data 116 which includes a first record entry 302 and a second record entry 302. At block 1204, the processing system node 102 accesses the record data 116. At block 1206, the processing system node 102 accesses the mapping data 122. At block 1208, the processing system node 102 generates parsed data 134 by transforming the record data 116 using the mapping data 122. The parsed data 134 may be generated within a designated amount of time after the generation of the record data 116.

In some implementations, transforming the record data 116 using the mapping data 122 includes converting the first record entry 302 to a first parsed entry 304 and converting the second record entry 302 to a second parsed entry 304.

At block 1210, the sink node 106(1) generates the format data 126. At block 1212, the processing system node 102 generates the event data 138 by applying the format data 126 to the parsed data 134. Applying the format data 126 to the parsed data 134 may include filtering the first parsed entry 304 from the parsed data 134 such that the first parsed entry 304 is removed from the parsed data 134. In some implementations, applying the format data 126 to the parsed data 134 includes decorating the second parsed entry 304 by supplementing the second parsed entry 304 with additional information.

At block 1214, the processing system node 102 provides the event data 138 to the sink node 106. At block 1216, the sink node 106 performs a computational task using the event data 138.

Figure 13:
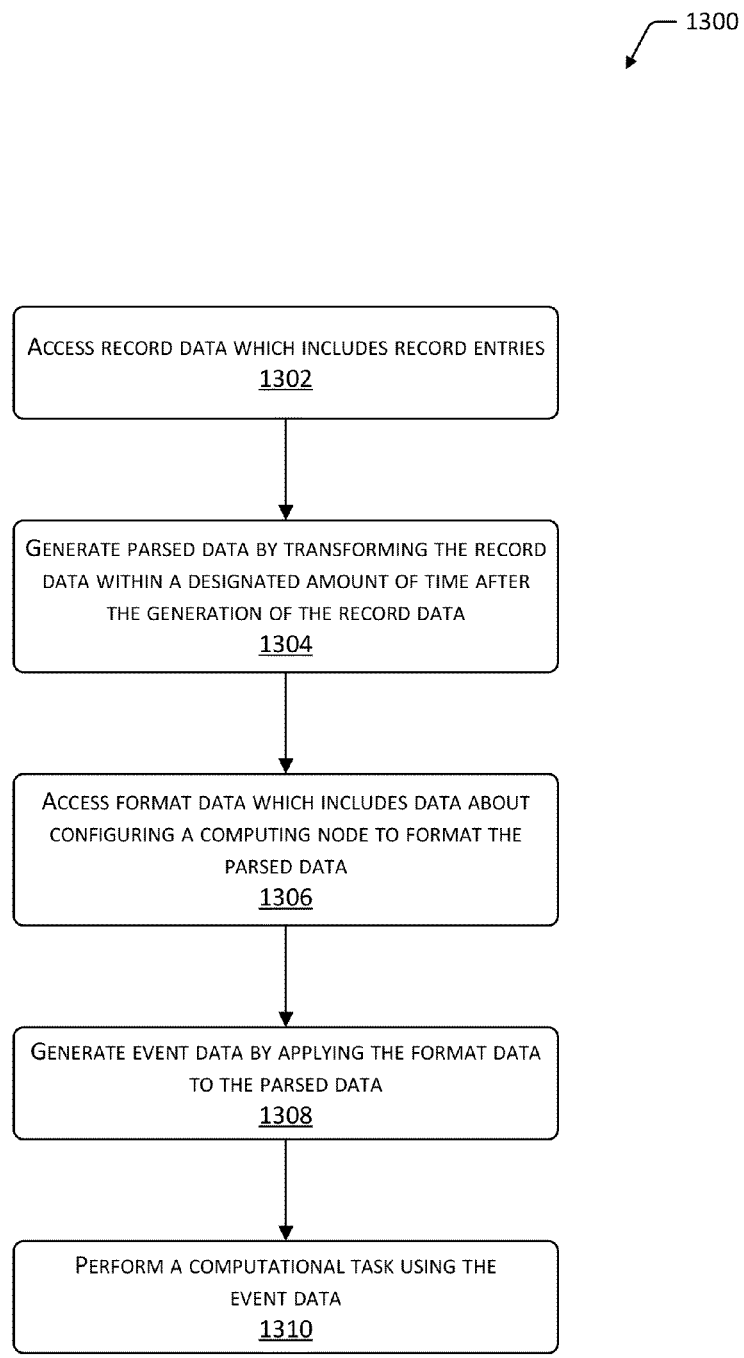
FIG. 13 is a flow diagram illustrating a process of generating event data by applying format data to the parsed data.

FIG. 13 is a flow diagram illustrating a process of generating event data 138 by applying format data 126 to the parsed data 134. The processing system node 102 may implement the process 1300. Although the process 1300 is described with reference to the flowchart illustrated in FIG. 13, many other methods performing the acts associated with the process 1300 may be used. For example, the order of the steps may be changed, some of the steps described may be optional, and additional steps may be included.

At block 1302, the processing system node 102 accesses record data 116, which includes record entries 302. The producer nodes 104(P) may provide the record data 116 to the processing system node 102.

At block 1304, the processing system node 102 generates parsed data 134 by transforming the record data 116 within a designated amount of time after the generation of the record data 116. In some implementations, transforming the record data 116 using the mapping data 122 includes changing an order of the record entries 302. In some implementations, generating the parsed data 134 by transforming the record data 116 includes associating the first record entry 302 with a first parsed entry 304 and associating the second record entry 302 with a second parsed entry 304.

At block 1306, the processing system node 102 accesses format data 126 which includes data about configuring a computing node to format the parsed data 134. For example, the format data 126 may comprise information configured to cause the processing system node 102 to format the parsed data 134.

At block 1308, the processing system node 102 generates event data 138 by applying the format data 126 to the parsed data 134. For example, the sink node 106(1) may use the event data 138 to determine whether particular items have been purchased. In some implementations, applying the format data 126 to the parsed data 134 includes filtering the first parsed entry 302 from the parsed data 134 such that the first parsed entry 302 is removed from the parsed data 134. Applying the format data 126 to the parsed data 134 may include decorating the second parsed entry 304 by supplementing the second parsed entry 304 with additional information. In some implementations, applying the format data 126 to the parsed data 134 includes changing an order of the first record entry 302 and the second record entry 302. Applying the format data 126 to the parsed data 134 may include converting the parsed data 134 to a markup language.

At block 1310, the sink node 106 performs a computational task using the event data 138. For example, the sink node 106(1) may use the event data 138 to determine whether particular items have been purchased.

Treatment Data Example Implementations

Figure 14:
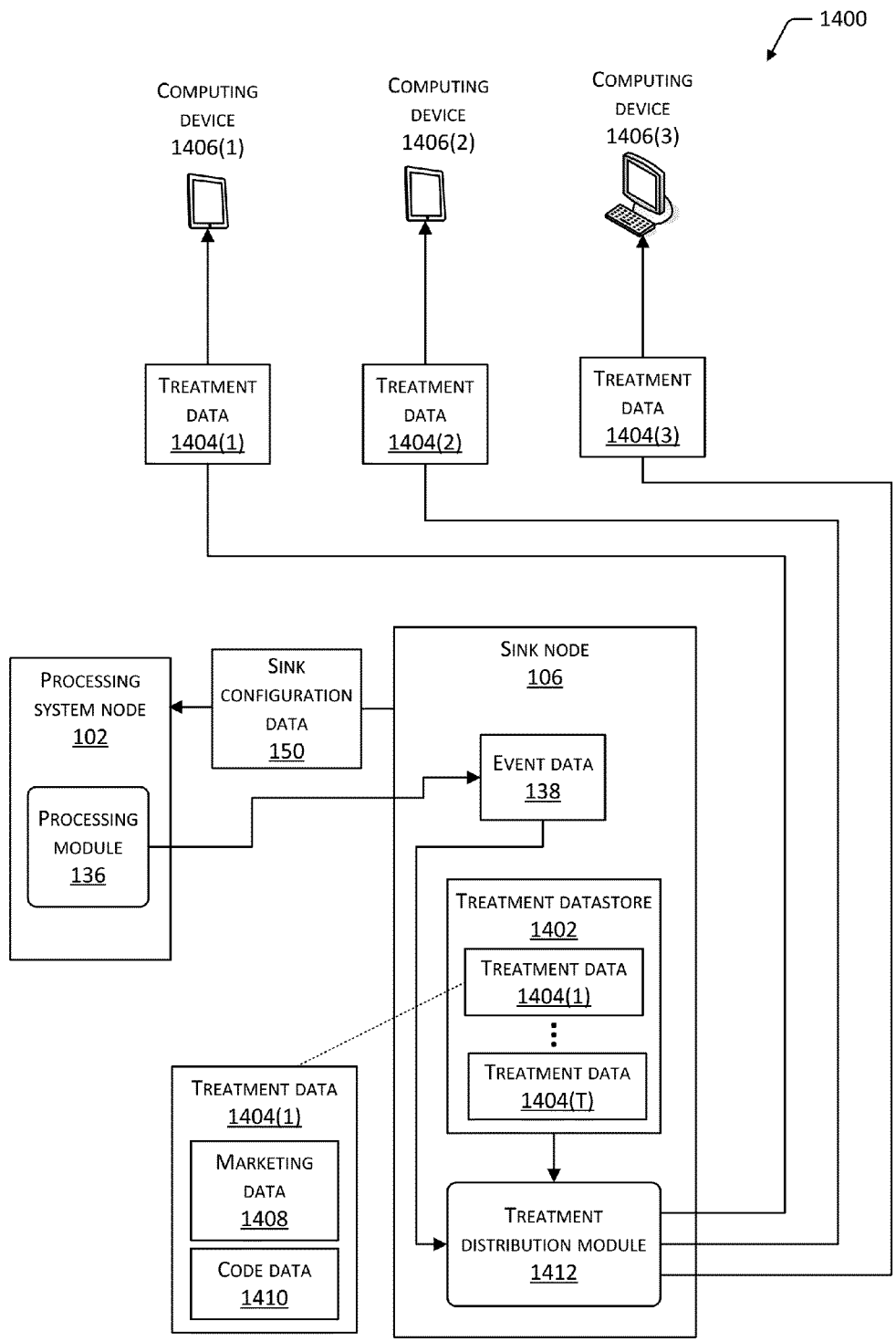
FIG. 14 is a block diagram of a system configured to provide treatment data for individual computing devices based on event data.

FIG. 14 is a block diagram of a system 1400 configured to provide treatment data for individual computing devices based on the event data 138. The system 1400 includes the processing system node 102 communicatively coupled to the sink node 106 using one or more networks.

The sink node 106 may include the sink configuration generation module 146 configured to generate the sink configuration data 150. The sink configuration data 150 may comprise information about configuring the processing system node 102. In FIG. 14, the sink node 106 provides the sink configuration data 150 to the processing system node 102.

The processing system node 102 includes the processing module 136 configured to generate the event data 138. In FIG. 14, the processing module 136 provides the event data 138 to the sink node 106. In this example, the event data 138 comprises information about success metrics which includes one or more quantitative measurements of the operation or performance of the computing devices 1406. The success metrics may be generated as the record data 116 described above. The success metrics may include various information. For example, the success metrics may include data about user interactions with web pages. In another example, the success metrics include data about whether a particular item has sold.

The sink node 106 includes a treatment datastore 1402 configured to store treatment data 1404(1), 1404(2), 1404(3), . . . , 1404(T). The treatment data 1404 may comprise various information which is configured to be processed by one or more computing devices 1406. The treatment data 1404 may comprise a service response, which is provided in response to a particular computing device 1406 requesting a service. In one example, different treatment data 1404 comprise different web pages that are provided in response to a request for web page. The web pages may have differences such as differences in layouts, color schemes, content, functionality, and so forth. In another example, as illustrated in FIG. 14, the treatment data 1404(1) may comprise at least one of marketing data 1408 or code data 1410.

The marketing data 1408 may comprise information which causes the computing device 1406 to present data in a particular configuration. For example, the marketing data 1408 may comprise data causing the computing device 1406(1) to display a web page with an advertisement positioned at a bottom-centered position of the display screen of the computing device 1406(1). The code data 1410 may comprise information about a set of code or software configured to be processed by the computing device 1406.

The record data 116(1) may comprise data indicating a user selection of a displayed advertisement, data indicating information was transferred to a particular computing device, data indicating that an item was purchased, or data indicating an occurrence of an error.

The computing devices 1406 may be implemented as the producer nodes 104 described above. In one example, the computing device 1406 is implemented as the producer node 104(1), which is configured to provide the record data 116(1) to the processing system node 102 illustrated in FIG. 14.

In FIG. 14, the sink node 106 includes a treatment distribution module 1412. The treatment distribution module 1412 may be configured to present one or more of the treatment data 1404 to the computing devices 1406 based on the event data 138. The event data 138 may comprise information about configuring the sink node 106 to change the treatment data 1404 provided to the computing device 1406. For example, at a first point in time, the treatment distribution module 1412 provides a first web page to a first computing device 1406(1). The first web page is configured to cause the first computing device 1406(1) to display an advertisement at a lower-centered position. Thereafter, the processing module 136 analyzes user interactions with the first web page. The processing module 136 may generate event data 138 comprising information about changing the first web page to a second web page configured to display the advertisement at an upper-right position of the display screen of the computing device 1406. In one example, the processing module 136 may be configured to generate the event data 138 that causes the change of the web page when a click through rate is equal to or less than a threshold value when the first web page is displayed.

In some implementations, the system 1400 includes a web server (not shown) configured to provide the treatment data 1404 to the computing devices 1406. In these implementations, the web server includes the treatment datastore 1402. In response to receiving request data from the web server, the sink node 106 may provide identification data to the web server. The identification data may be used to identify which treatment data 1404 to send to which computing device 1406.

Figure 15:
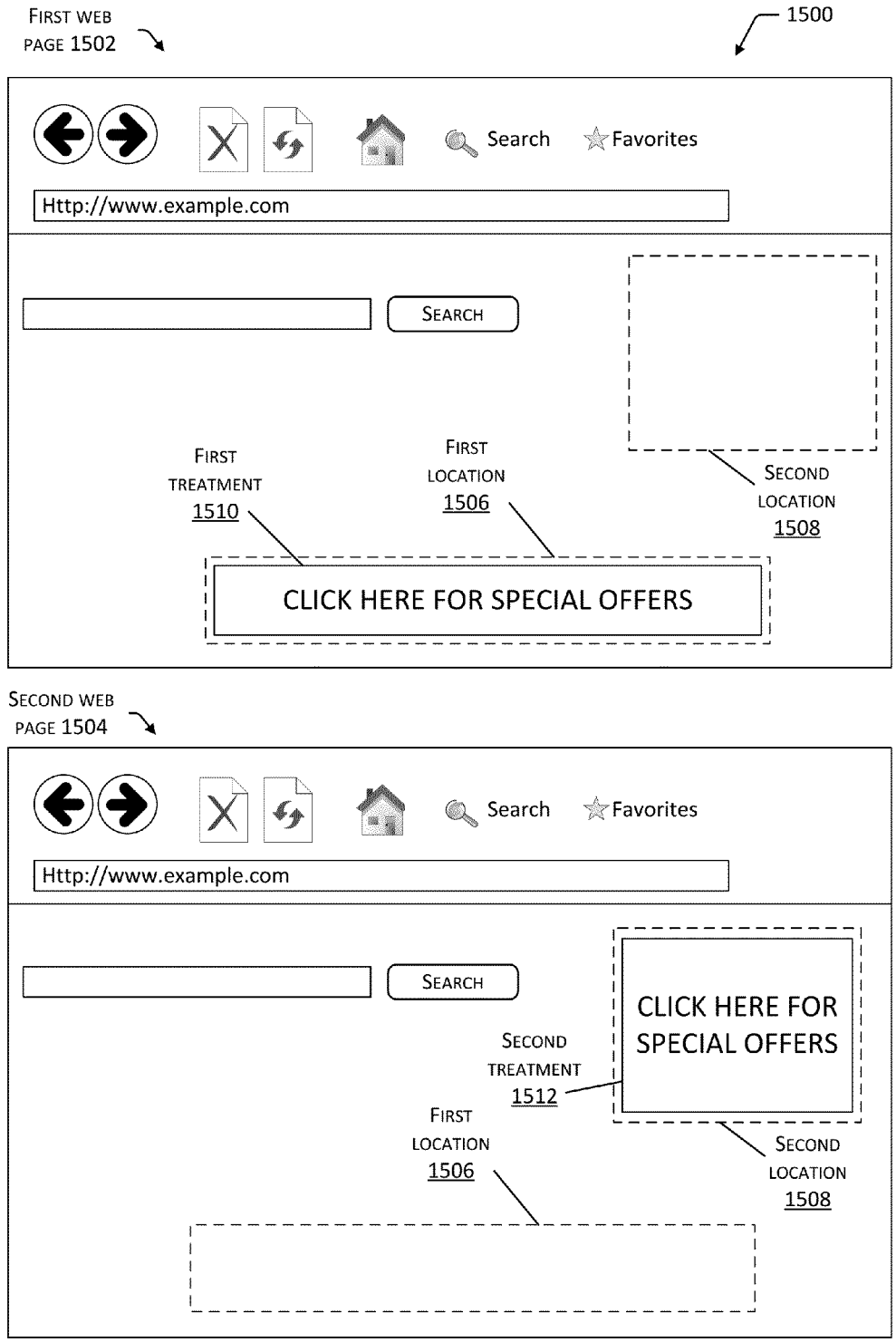
FIG. 15 illustrates example displayed web pages, illustrating different treatments being displayed at different locations.

FIG. 15 illustrates example displayed web pages, illustrating different treatments being displayed at different locations. At a first point in time, the computing device 1406 presents a first web page 1502, and at a second point in time, the computing device 1406 presents a second web page 1504.

The first web page 1502 has various locations including a first location 1506 and a second location 1508. In FIG. 15, the computing device 1406 presents a first treatment 1510 at the first location 1506 of the first web page 1502. The first treatment 1510 comprises an advertisement positioned at a lower-centered location of the display screen of the computing device 1406. In this example, the advertisement states "CLICK HERE FOR SPECIAL OFFERS."

Referring to the second web page 1504, the computing device 1406 presents a second treatment 1512 at the second location 1508 of the second web page 1504. The second treatment 1512 comprises an advertisement positioned at an upper-right location of the display screen of the computing device 1406. In this example, the advertisement states "CLICK HERE FOR SPECIAL OFFERS."

The sink node 106 may cause the computing device 1406 to change the display of the first treatment 1510 at the first location 1506 to the display of the second treatment 1510 at the second location 1508 based on an analysis of the event data 138. For example, a historical analysis of the event data 138 may indicate that a greater number of user clicks occur when an advertisement is displayed at the second location 1508, when compared to the advertisement being displayed at the first location 1506. In another example, a historical analysis of the event data 138 may indicate that a greater number of errors are generated when an advertisement is displayed at the second location 1508, when compared to the advertisement being displayed at the first location 1506.

In some implementations, a first group of users is served web pages that remain unchanged over time and a second group of users is served web pages that undergo various changes over time. In this manner, users in different groups view different web pages (e.g., different layouts, color schemes, content, functionality, etc.) and engage in different experiences with the web pages. The users' interactions with the different web pages are tracked and analyzed in an effort to determine whether adjustments made to the web pages had an effect on user behavior.

Figure 16:
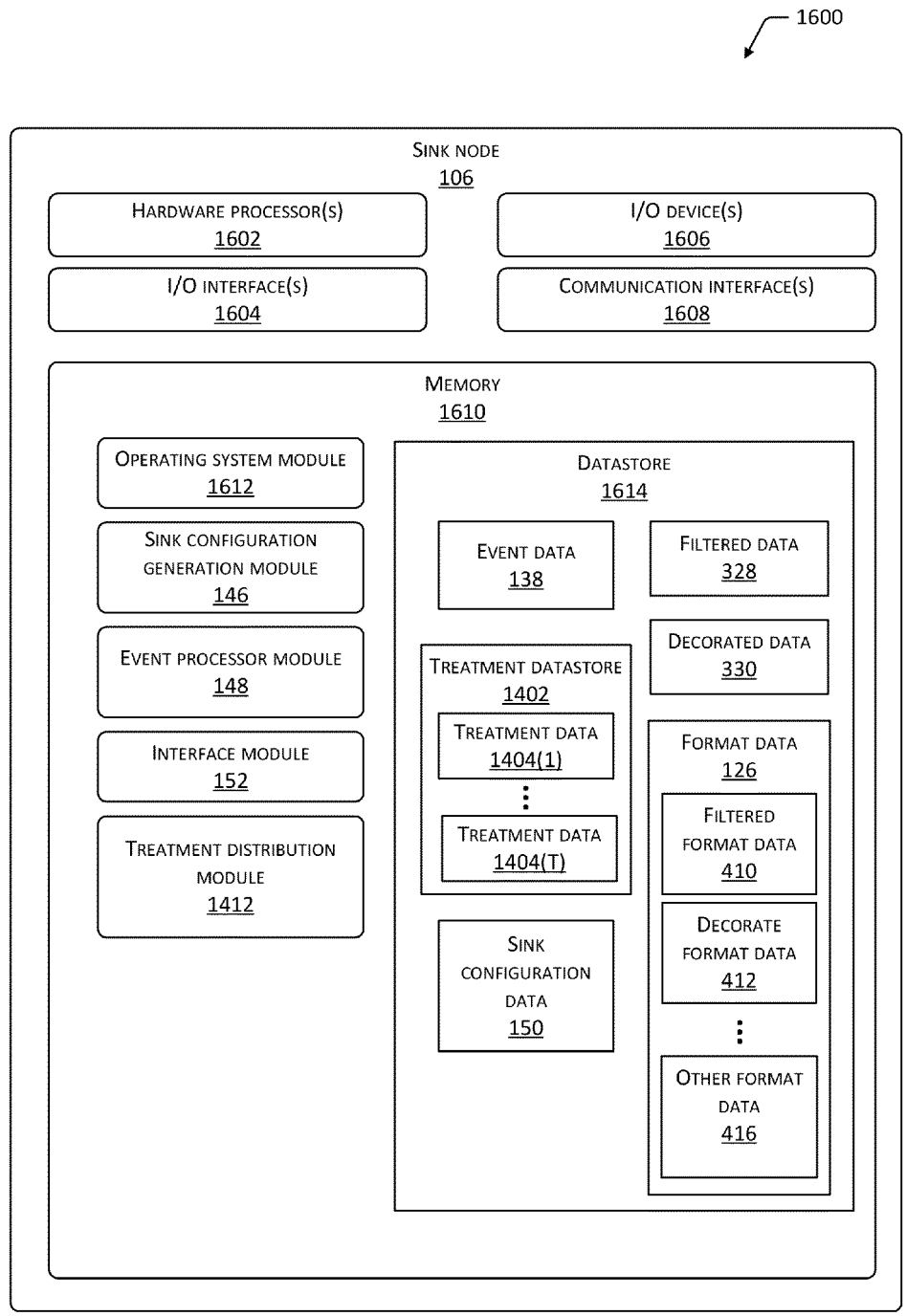
FIG. 16 is a block diagram of a sink node configured to select and distribute treatment data for individual computing devices based on event data.

FIG. 16 is a block diagram of an example sink node 106 configured to select and distribute treatment data 1404 for individual computing devices 1406 based on event data 138. The sink node 106 may include at least one hardware processor 1602 configured to execute stored instructions. The at least one hardware processor 1602 may comprise one or more cores.

The sink node 106 includes at least one I/O interface, 1604 which enables portions of the sink node 106 (e.g., the hardware processor 1602) to communicate with other devices. The I/O interface 1604 may include I2C, SPI, USB, RS-232, HDMI, TOSLINK®, Bluetooth®, and so forth. The at least one I/O interface 1604 may be coupled to at least one I/O device 1606. In some implementations, certain I/O devices 1606 are physically incorporated within the sink node 106 or externally placed.

The sink node 106 may include at least one communication interface 1608. The communication interface 1608 may be configured to provide communications between the sink node 106 and other devices, such as servers, routers, access points, and so forth. The communication interface 1608 may connect to a network.

The sink node 106 may include at least one bus or other internal communications hardware or software that enables the transfer of data between the various modules and components of the sink node 106.

As illustrated in FIG. 16, the sink node 106 may include at least one memory or memory device 1610. The memory 1610 may include one or more non-transitory CRSM. The CRSM may include at least one of an electronic storage medium, a magnetic storage medium, an optical storage medium, a quantum storage medium, a mechanical computer storage medium, and so forth. The memory 1610 may include computer readable instructions, data structures, program modules, and other data for the operation of the sink node 106.

The memory 1610 may include at least one OS module 1612. The OS module 1612 may be configured to manage hardware resources such as the I/O interfaces 1604, the I/O devices 1606, the communication interfaces 1608, and provide various services to applications or modules executing on the hardware processor 1602. The memory 1610 may also store at least one of the following modules which may be executed as foreground applications, background tasks, daemons, and so forth.

The memory 1610 may include the sink configuration generation module 146 configured to generate the sink configuration data 150. The sink configuration data 150 may comprise information about configuring the processing system node 102.

The memory 1610 may include the event processor module 148 configured to perform one or more computational tasks using the event data 138. In one example, the computational task includes generating alarm data which indicates that a particular item has been sold at a predetermined rate. For example, a particular database may indicate that an item has been selling at a rate of over fifty per day for the last week. In some implementations, the event processor module 148 comprises the treatment distribution module 1412.

The memory 1610 may include the interface module 152 that enables administrative users to operate with the sink node 106 to generate the format data 126 based on user input. In some implementations, another computing device (not shown) includes the interface module 152 that enables the administrative user to generate the format data 126 based on user input.

The memory 1610 may include the treatment distribution module 1412. As discussed above, the treatment distribution module 1412 may be configured to present one or more of the treatment data 1404 to the computing devices 1406 based on the event data 138.

In some implementations, the memory 1610 includes a datastore 1614 for storing information. The datastore 1614 may use a flat file, database, linked list, code, tree, or other data structure to store the information. In some implementations, the datastore 1614, or a portion thereof, may be distributed across at least one other device, such as another server, a network storage device, and so forth. As illustrated in FIG. 16, the datastore 1614 may include the event data 138, the treatment datastore 1402, the sink configuration data 150, the filtered data 328, the decorated data 330, and the format data 126.

Figure 17:
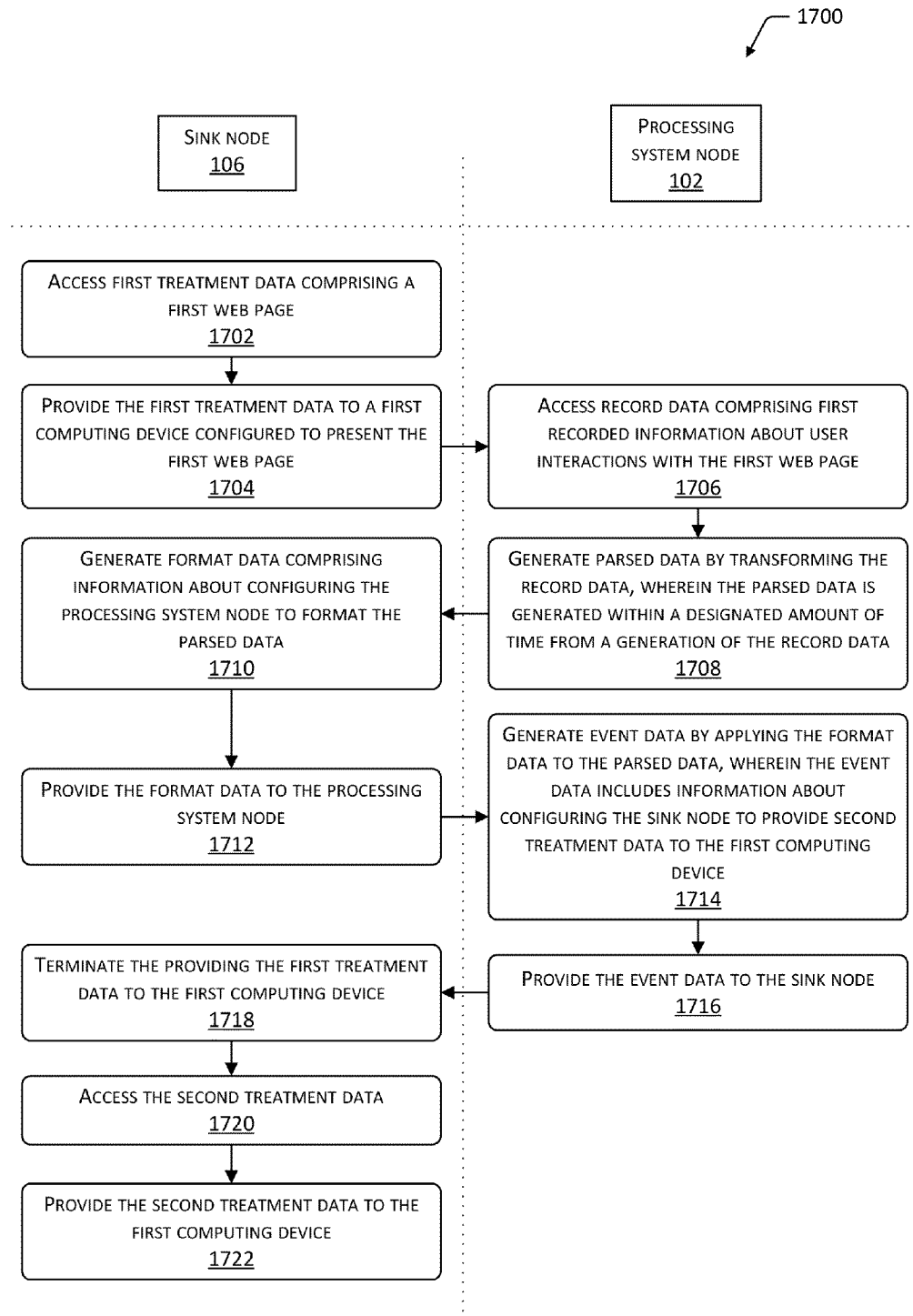
FIG. 17 is a flow diagram illustrating a process of providing different treatment data to a computing device based on generated event data.

FIG. 17 is a flow diagram illustrating a process 1700 of providing different treatment data 1404 to a computing device 1406 based on generated event data 138. The processing system node 102 and the sink node 106 may implement the process 1700. Although the process 1700 is described with reference to the flowchart illustrated in FIG. 17, many other methods performing the acts associated with the process 1700 may be used. For example, the order of the steps may be changed, some of the steps described may be optional, and additional steps may be included.

At block 1702, the sink node 106 accesses first treatment data 1404 comprising a first web page 1502. The first treatment data 1404 may comprise marketing data 1408 configured to cause a first computing device 1406 to display an advertisement at a first location 1506 of a display screen of the first computing device 1406. In another example, the first treatment data 1404 may include code data 1410 comprising a first set of code, instructions, or software. The sink node 106 may be configured to compare different code data 1410 to determine which code data 1410 causes less errors.

At block 1704, the sink node 106 provides the first treatment data 1404 to a first computing device 1406 configured to present the first web page 1502. The sink node 106 may provide the first treatment data 1404 to the first computing device 1406 based on an analysis of the event data 138. For example, the analysis of the event data 138 may indicate that when the first treatment data 1404 is presented by the first computing device 1406, a particular item sells at a predetermined threshold rate.

At block 1706, the processing system node 102 accesses record data 116 comprising first recorded information about user interactions with the first web page 1502. In one example, the user interactions may comprise information about whether a particular advertisement was clicked. In another example, the user interactions may comprise information about whether a particular item was purchased.

At block 1708, the processing system node 102 generates parsed data 134 by transforming the record data 116. The parsed data 134 is generated within a designated amount of time from a generation of the record data 116. The record data 116 may comprise a first record entry 302 comprising information about a first user interaction with the first web page 1502 and a second record 302 entry comprising information about a second user interaction with the first web page 1502. The processing system node 102 may generate the parsed data 134 by associating the first record entry 302 with a first parsed entry 304 and the second record entry 302 with a second parsed entry 304.

At block 1710, the sink node 106 generates format data 126 comprising information about configuring the processing system node 102 to format the parsed data 134. At block 1712, the sink node 106 provides the format data 126 to the processing system node 102. In other implementations, the sink node 106 provides the format data 126 to the configuration node 108, rather than the processing system node 102. As described above, the processing system node 102 may access the format data 126 from the configuration node 108.

At block 1714, the processing system node 102 generates event data 138 by applying the format data 126 to the parsed data 134. The event data 138 includes information about configuring the sink node 106 to provide second treatment data 1404 to the first computing device 1406. In one example, the parsed data 134 comprises a first parsed entry 304 and a second parsed entry 304. Applying the format data 126 to the parsed data 134 may include filtering the first parsed entry 304 from the parsed data 134 such that the first parsed entry 304 is removed from the parsed data 134. Applying the format data 126 to the parsed data 134 may also include decorating the second parsed entry 304 by supplementing the second parsed entry 304 with additional information.

The second treatment data 1404 may comprise second marketing data 1408 that is configured to cause the first computing device 1406 to display an advertisement at a second location 1508 of the display screen of the first computing device 1406.

At block 1716, the processing system node 102 provides the event data 138 to the sink node 106. At block 1718, the sink node 106 terminates providing the first treatment data 1404 to the first computing device 1406. At block 1720, the sink node 106 accesses the second treatment data 1404. At block 1722, the sink node 106 provides the second treatment data 1404 to the first computing device 1406.

Figure 18:
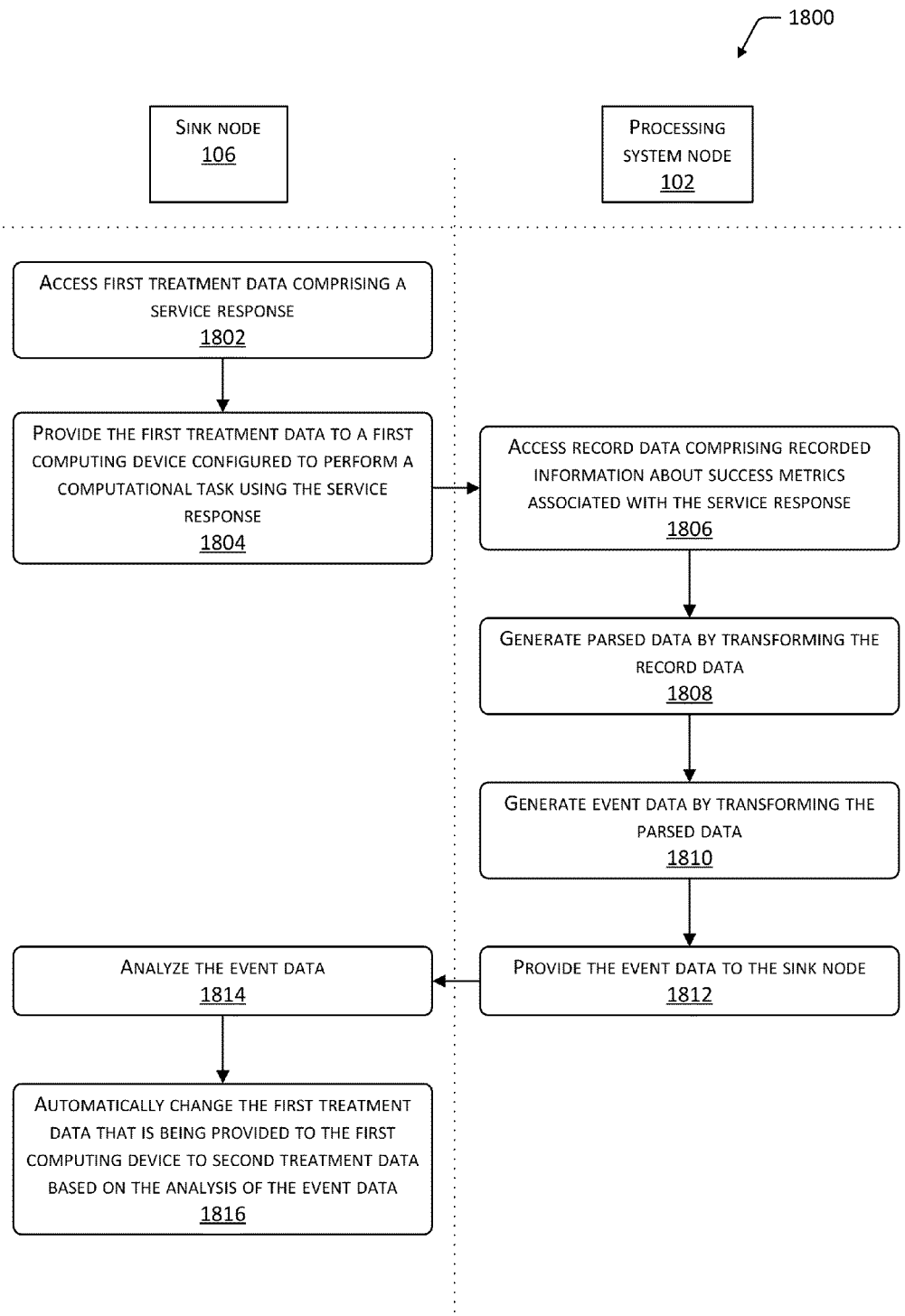
FIG. 18 is a flow diagram illustrating a process of the sink node changing the treatment data based on an analysis of the event data.

FIG. 18 is a flow diagram illustrating a process 1800 of the sink node 106 changing the treatment data 1404 based on an analysis of the event data 138. The processing system node 102 and the sink node 106 may implement the process 1800. Although the process 1800 is described with reference to the flowchart illustrated in FIG. 18, many other methods performing the acts associated with the process 1800 may be used. For example, the order of the steps may be changed, some of the steps described may be optional, and additional steps may be included.

At block 1802, the sink node 106 accesses first treatment data 1404 comprising a service response. The service response may comprise data which is provided in response to a particular computing device 1406 requesting a service. For example, the computing device 1406(1) may provide data to the sink node 106 indicative of a request for a web page. The sink node 106 may provide the service response which may include the first web page 1502. The service response may include markup language data such as XML data.

At block 1804, the sink node 106 provides the first treatment data 1404 to a first computing device 1406 configured to perform a computational task using the service response. In one example, the sink node 106 provides the treatment data 1404(1) to the computing device 1406(1), which is configured to present the first web page 1502.

At block 1806, the processing system node 102 accesses record data 116 comprising recorded information about success metrics associated with the service response. In one example, the success metrics include user interactions with the first web page 1502. In another example, the success metrics include data about the price at which an item has sold. The record data 116 may comprise at least one of data about a user selection of a displayed advertisement, data which indicates that information was transferred to a particular computing device, data indicating an item was purchased, or data indicating an occurrence of an error.

At block 1808, the processing system node 102 generates parsed data 134 by transforming the record data 116. The parsed data 134 may be generated within a designated amount of time after the generation of the record data 116. In some implementations, in response to a determination that the parsed data 134 is not generated within a designated amount of time from the generation of the record data 116, the processing system node 102 causes another computing node to operate in cooperation with the processing system node 102. This additional computing node operates such that subsequently generated parsed data 134 is generated within the designated amount of time. In some implementations, once the determination is made, the processing system node 102 provides producer configuration data 112 comprising information that causes the producer node 104 to provide generated record data 116 to the computing node operating in cooperation with the processing system node 102. The computing node operating in cooperation with the processing system node 102 may be located within the processing system node 102. The designated amount of time may be determined based on a percentage. For example, for a system which requires the parsed data 134 or the event data 138 to be generated within twenty seconds, if the processing system determines that the parsed data 134 or the event data 138 will be generated in at least sixteen seconds (i.e., eighty percent of twenty seconds), then the processing system node 102 may be configured to cause the computing node to operate in cooperation with the processing system node 102. In one example, transforming the record data 116 includes changing an order of the first record entry 302 and the second record entry 302.

At block 1810, the processing system node 102 generates event data 138 by transforming the parsed data 134. The processing system node 102 may transform the parsed data 134 by applying format data 126 to the parsed data 134. The format data 126 may comprise information about configuring the processing system node 102 to format the parsed data 134 and may be generated based on user input. Applying the format data 126 may include filtering one or more parsed entries 304 from the parsed data 134 such that the one or more parsed entries 304 are removed from the parsed data 134. In another example, applying the format data 126 includes decorating the one or more parsed entries 304 by supplementing the one or more parsed entries 304 with additional information. In another example, applying the format data 126 includes converting the parsed data 134 to a markup language. In some implementations, the event data 138 comprises the configuration data 326. The configuration data 326 may comprise information about selecting one or a plurality of different treatment data 1404.

At block 1812, the processing system node 102 provides the event data 138 to the sink node 106. At block 1814, the sink node 106 analyzes the event data 138. At block 1816, the sink node 106 automatically changes the first treatment data 1404 that is being provided to the first computing device 1406 to second treatment data 1404 based on the analysis of the event data 138. Automatically changing the treatment data 1404 may include changing the treatment data 1404 without any human interaction. In one example, the sink node 106 changes the first treatment data 1404 to the second treatment data 1404 in response to a determination that a click rate is equal to a less than a threshold value when the advertisement is displayed at the first location 1506. By causing the sink node 106 to analyze the click rates, costs may be reduced. Costs may be reduced because the sink node 106 may determine, at a faster rate, which treatments have higher click rates when compared to the amount of time in which users analyze the click rates, and then cause the sink node 106 to change to a relatively better treatment.

The analysis of the event data 138 may include analyzing click through rates associated with the treatment data 1404. For example, the sink node 106 may change from the treatment data 1404(1) to the treatment data 1404(2) because the click through rate for the treatment data 1404(2) is higher than the click through rate for the treatment data 1404(1).

The analysis of the event data 138 may include analyzing sales data associated with the treatment data 1404. For example, the sink node 106 may change from the treatment data 1404(1) to the treatment data 1404(2) because the sales data for the treatment data 1404(2) indicates that items are sold at a higher rate when compared the rate for the treatment data 1404(1).

In another example, the analysis of the event data 138 may include analyzing error data associated with the treatment data 1404. For example, the sink node 106 may increase the percentage associated with the treatment data 1404(2) when compared to the percentage associated with the treatment data 1404(1) because less errors occur when the computing devices 1406 execute the treatment data 1404(2) than when the computing devices 1406 execute the treatment data 1404(1).

In some implementations, the analysis of the event data 138 may include analyzing latencies associated with the treatment data 1404. In one example, the sink node 106 increases the percentage associated with the treatment data 1404(2) when compared to the percentage associated with the treatment data 1404(1) because computing devices 1406 executing the treatment data 1404(2) load web pages faster than computing devices 1406 executing the treatment data 1404(1).

In some implementations, the treatment distribution module 1412 determines particular treatment data 1404 to provide to the computing devices 1406 based on percentages. For example, the sink node 106 may assign the treatment data 1404(1) with a first percentage of ninety percent, and may assign the treatment data 1404(2) with a second percentage of ten percent. In this example, the sink node 106 provides the treatment data 1404(1) ninety percent of the time to the computing devices 1406, and provides the treatment data 1404(2) ten percent of the time to the computing devices 1406. Over time, if the treatment data 1404(2) becomes more successful when compared to the treatment data 1404(1), the sink node 106 may be configured to automatically change the percentages assigned to the treatment data 1404(1) and 1404(2). For example, the sink node 106 may increase the percentage assigned to the treatment data 1404(2) because the treatment data 1404(2) has a better success rate.

The processing system node 102 may determine the percentages associated with the treatment data 1404 based on the analysis of the record data 116. The processing system node 102 may provide the percentages to the sink node 106. Once the sink node 106 receives the percentages, the sink node 106 may assign the percentages to the treatment data 1404.

Recommendation Data Example Implementations

Figure 19:
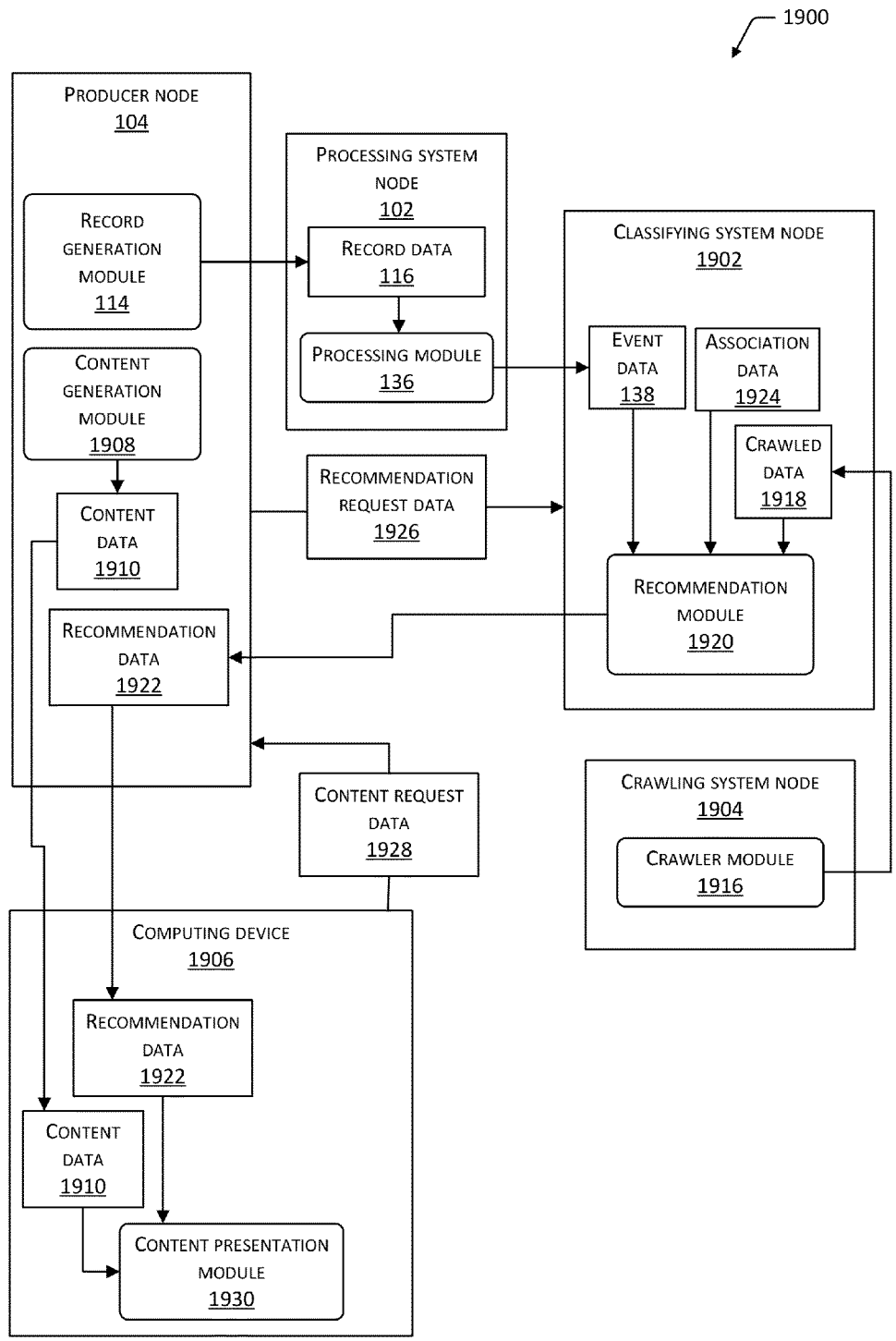
FIG. 19 is a block diagram of a system configured to generate recommendation data based on the event data, and provide the recommendation data to a computing device.

FIG. 19 is a block diagram of a system 1900 configured to generate recommendation data based on the event data 138 and provide the recommendation data to a computing device. The system 1900 includes the following: the processing system node 102, the producer node 104, a classifying system node 1902, a crawling system node 1904, and a computing device 1906.

The producer node 104 includes the record generation module 114 configured to generate the record data 116. In this example, the record data 116 may comprise recorded information including unique identifier data comprising unique identifiers associated with a plurality of users. The record data 116 may also include web browsing data comprising information about web browsing history associated with the unique identifiers. In FIG. 19, the record generation module 114 provides the record data 116 to the processing system node 102. The producer node 104 also includes a content generation module 1908 configured to generate content data 1910. The content data 1910 may include audio data, video data, electronic book data, application data, game data, and so forth.

The producer node 104 may use a web browser having a plurality of different subsystems. The subsystems may include a networking subsystem, a hypertext markup language subsystem, a page rendering subsystem, and so forth. In some implementations, the producer node 104 may execute one or more of the subsystems, and the computing device 1906 may execute one or more of the subsystems.

The processing system node 102 includes the processing module 136, which is configured to generate the event data 138 as described above. In one example, the processing module 136 generates the event data 138 by applying the format data 126 to the parsed data 134.

The crawling system node 1904 includes a crawler module 1916 configured to generate crawled data 1918. The crawled data 1918 may comprise information about web pages. In FIG. 19, the crawler module 1916 provides the crawled data 1918 to the classifying system node 1902.

The classifying system node 1902 includes a recommendation module 1920 configured to generate recommendation data 1922. The recommendation data 1922 may comprise information about at least one unique identifier associated with at least one recommended web address. In some implementations, the recommendation module 1920 generates the recommendation data 1922 based on the event data 138, the crawled data 1918, and association data 1924. The association data 1924 may comprise data about thresholds and recommended web addresses. The classifying system node 1902 is communicatively coupled to the producer node 104. The classifying system node 1902 may be implemented as the sink node 106. In FIG. 19, the recommendation module 1920 provides the recommendation data 1922 to the producer node 104 in response to receiving recommendation request data 1926 comprising information that causes the recommendation module 1920 to provide the recommendation data 1922.

In FIG. 19, the computing device 1906 provides content request data 1928 to the producer node 104. The content request data 1928 comprises information configured to cause the producer node 104 to provide the content data 1910. In this example, once the producer node 104 receives the content request data 1928, the producer node 104 provides the content data 1910 and the recommendation data 1922 to the computing device 1906.

Once the content data 1910 and the recommendation data 1922 are received, a content presentation module 1930 presents the content data 1910 and the recommendation data 1922 to a user of the computing device 1906.

In some implementations, the classifying system node 1902 may include an indexing module (not shown). The indexing module may be configured to generate data that is used by the crawler module 1916 to generate the crawled data

1918. In one example, the indexing module generates an index to optimize speed and performance in finding relevant event data 138.

Figure 20:
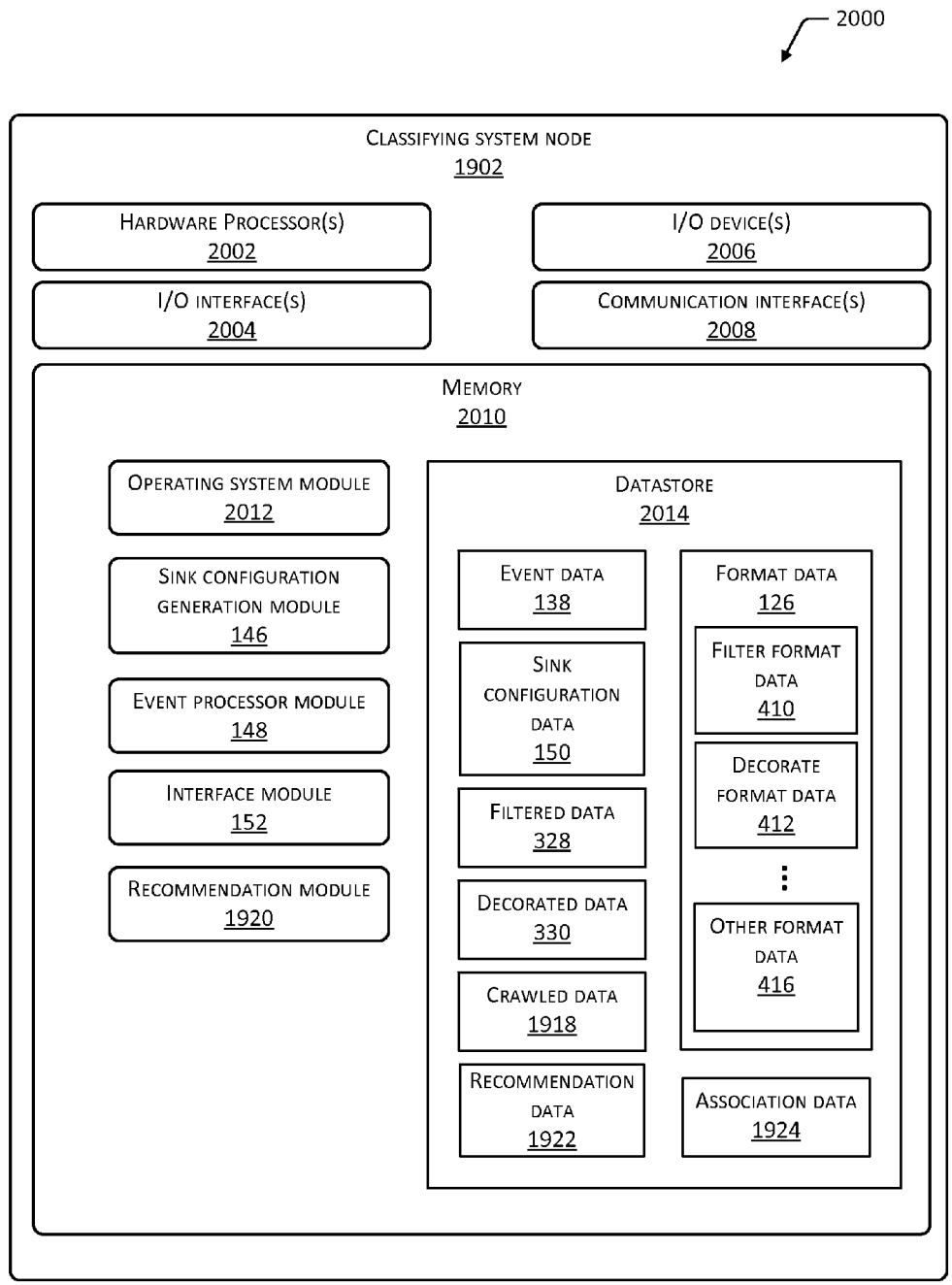
FIG. 20 is a block diagram of a classifying system node configured to generate recommendation data based on the event data.

FIG. 20 is a block diagram 2000 of the classifying system node 1902 configured to generate the recommendation data 1922 based on the event data 138. The classifying system node 1902 may include at least one hardware processor 2002 configured to execute stored instructions. The at least one hardware processor 2002 may comprise one or more cores.

The classifying system node 1902 includes at least one I/O interface 2004, which enables portions of the classifying system node 1902 (e.g., the hardware processor 2002) to communicate with other devices. The I/O interface 2004 may include I2C, SPI, USB, RS-232, HDMI, TOSLINK®, Bluetooth®, and so forth. The at least one I/O interface 2004 may be coupled to at least one I/O device 2006. In some implementations, certain I/O devices 2006 are physically incorporated with the classifying system node 1902 or externally placed.

The classifying system node 1902 may include at least one communication interface 2008. The communication interface 2008 may be configured to provide communications between the classifying system node 1902 and other devices, such as servers, routers, access points, and so forth. The communication interface 2008 may connect to a network.

The classifying system node 1902 may include at least one bus or other internal communications hardware or software that enables for the transfer of data between the various modules and components of the classifying system node 1902.

As illustrated in FIG. 20, the classifying system node 1902 may include at least one memory or memory device 2010. The memory 2010 may include one or more non-transitory CRSM. The CRSM may include at least one of an electronic storage medium, a magnetic storage medium, an optical storage medium, a quantum storage medium, a mechanical computer storage medium, and so forth. The memory 2010 may include computer readable instructions, data structures, program modules, and other data for the operation of the classifying system node 1902.

The memory 2010 may include at least one OS module 2012. The OS module 2012 may be configured to manage hardware resources such as the I/O interfaces 2004, the I/O devices 2006, the communication interfaces 2008, and provide various services to applications or modules executing on the hardware processor 2002. The memory 2010 may also store at least one of the following modules, which may be executed as foreground applications, background tasks, daemons, and so forth.

The memory 2010 may include the sink configuration generation module 146 configured to generate the sink configuration data 150. The sink configuration data 150 may comprise information about configuring the processing system node 102.

The memory 2010 may include the event processor module 148 configured to perform one or more computational tasks using the event data 138. The event processor module 148 may comprise the recommendation module 1920.

The memory 2010 may include the interface module 152 that enables administrative users to operate with the classifying system node 1902 to generate the format data 126 based on user input. In some implementations, another computing device (not shown) includes the interface module 152 that enables the administrative user to generate the format data 126 based on user input.

The memory 2010 may include the recommendation module 1920 configured to generate the recommendation data 1922. The recommendation module 1920 may generate the recommendation data 1922 based on the event data 138, crawled data 1918, and association data 1924.

In some implementations, the memory 2010 includes a datastore 2014 for storing information. The datastore 2014 may use a flat file, database, linked list, code, tree, or other data structure to store the information. In some implementations, the datastore 2014, or a portion thereof, may be distributed across at least one other device, such as another server, a network storage device, and so forth. As illustrated in FIG. 20, the datastore 2014 may include the event data 138, the sink configuration data 150, the filtered data 328, the decorated data 330, the format data 126, the recommendation data 1922 and the association data 1924. The event data 138 may comprise information about data indicating a user selection of a displayed advertisement or data indicating a user selection of a displayed web address.

Figure 21:
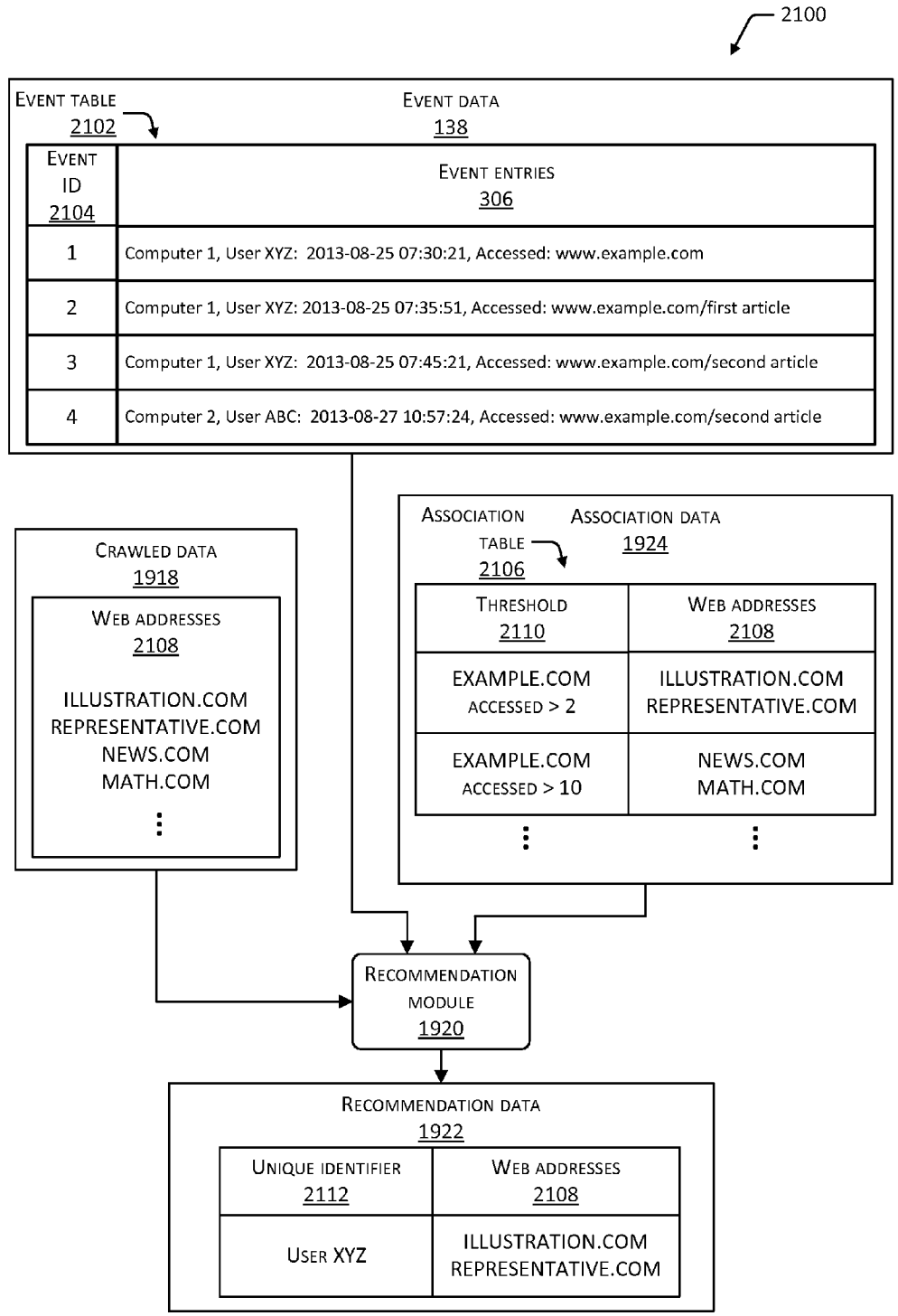
FIG. 21 is a block diagram of a recommendation module generating recommendation data based on the event data, association data, and crawled data.

FIG. 21 is a block diagram of the recommendation module 1920 generating the recommendation data 1922 based on the event data 138, the crawled data 1918, and the association data 1924. The event data 138 includes an event table 2102, which includes data characterized as being organized in columns and rows. The rows of the event table 2102 represent events associated with event IDs 2104.

The events include the event entries 306. The event associated with event ID 2104 "1" comprises the following five event entries 306: 1) "Computer 1"; 2) "User XYZ"; 3) "2013-08-25"; 4) "07:30:21"; and 5) "Accessed: www.example.com". The event associated with event ID 2104 "2" comprises the following five event entries 306: 1) "Computer 1"; 2) "User XYZ"; 3) "2013-08-25"; 4) "07:35:51"; and 5) "Accessed: www.example.com/first article". The event associated with event ID 2104 "3" comprises the following five event entries 306: 1) "Computer 1"; 2) "User XYZ"; 3) "2013-08-25"; 4) "07:45:21"; and 5) "Accessed: www.example.com/second article". The event associated with event ID 2104 "4" comprises the following five event entries 306: 1) "Computer 2"; 2) "User ABC"; 3) "2013-08-27"; 4) "10:57:24"; and 5) "Accessed: www.example.com/second article". The event entries 306 may further comprise information about data indicating a user selection of a displayed advertisement or data indicating a user selection of a displayed web address.

The crawled data 1918 may comprise information about web pages. In FIG. 21, the crawled data 1918 includes web addresses 2108. The web addresses 2108 include "illustration.com, representative.com, news.com, and math.com".

The association data 1924 includes an association table 2106. The columns of the association table 2106 include the following fields: threshold 2110 and web addresses 2108. The thresholds 2110 in the association table 2106 include the following values: "EXAMPLE.COM ACCESSED>2"; and "EXAMPLE.COM ACCESSED>10". The thresholds 2110 are used by the recommendation module 1920 to determine whether to recommend any associated web addresses 2108. For example, based on the association table 2106, if the event data 138 indicates that a user associated with a unique identifier has accessed "example.com" more than ten times, the web addresses "news.com" and "math.com" would be recommended to a computing device associated with the unique identifier.

In FIG. 21, the recommendation module 1920 generates the recommendation data 1922 by associating unique identifiers 2112 to the web addresses 2108. For example, the recommendation module 1920 associates the unique identifier 2112 "USER XYZ" to the web addresses 2108 "ILLUSTRATION.COM" and "REPRESENTATIVE.COM" because an analysis of the event data 138 indicates that the threshold has been triggered. That is, as illustrated by the event entries 306 the "USER XYZ" has accessed the website example.com more than twice. As illustrated in FIG. 21, the recommendation data 1922 comprises the user identifier 2112 "User XYZ" associated with web addresses 2108 "illustration.com" and "representative.com". Once the recommendation data 1922 is generated, the recommendation data 1922 may be provided to a computing device associated with the unique identifier.

In some implementations, the classifying system node 1902 generates the association data 1924 based on the crawled data 1918. For example, the classifying system node 1902 may include a datastore configured to store previously collected crawled data 1918, which may include a collection of text data from a plurality of web pages. When the crawler module 1916 generates new crawled data 1918 based on a new web page having new text data, the classifying system node 1902 may determine that the new web page includes a threshold amount of the same text data as some of the previously generated crawled data 1918. Because the new web page is similar to one or more of the previously crawled web pages, the classifying system node 1902 may generate new or updated association data 1924 that includes information associating the new web page with one or more previously crawled web pages.

The classifying system node 1902 may generate the association data 1924 based on behavior data, which comprises information about user interactions with one or more web pages. In one example, the classifying system node 1902 accesses behavior data that indicates a particular user associated with a first unique identifier spends a designated amount of time on a first web page and a second web page. In this example, the classifying system node 1902 determines that a new user associated with a second unique identifier spends the designated amount of time on the first web page. Because the first user and the second user spend the designated amount of time on the first web page, the classifying system node 1902 may generate association data 1924, which causes the second user to receive a recommendation that includes the second web page.

Figure 22:
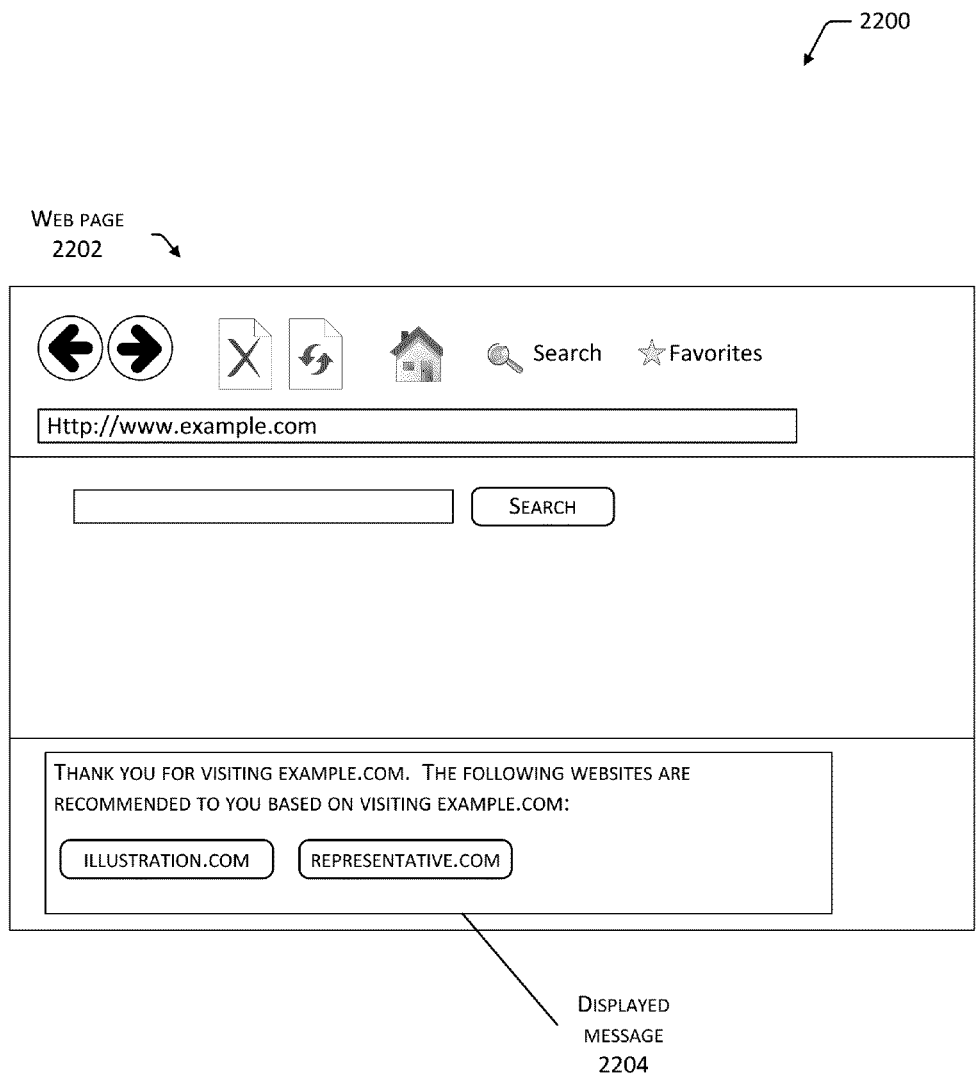
FIG. 22 illustrates an example displayed web page, illustrating the display of recommended websites.

FIG. 22 illustrates an example displayed web page 2202, illustrating the computer device 1906 displaying recommended websites. The computing device 1906 presents the web page 2202, which includes a displayed message 2204. The displayed message 2204 comprises the following text: "THANK YOU FOR VISITING EXAMPLE.COM. THE FOLLOWING WEBSITES ARE RECOMMENDED TO YOU BASED ON VISITING EXAMPLE.COM: ILLUSTRATION.COM REPRESENTATIVE.COM".

Figure 23:
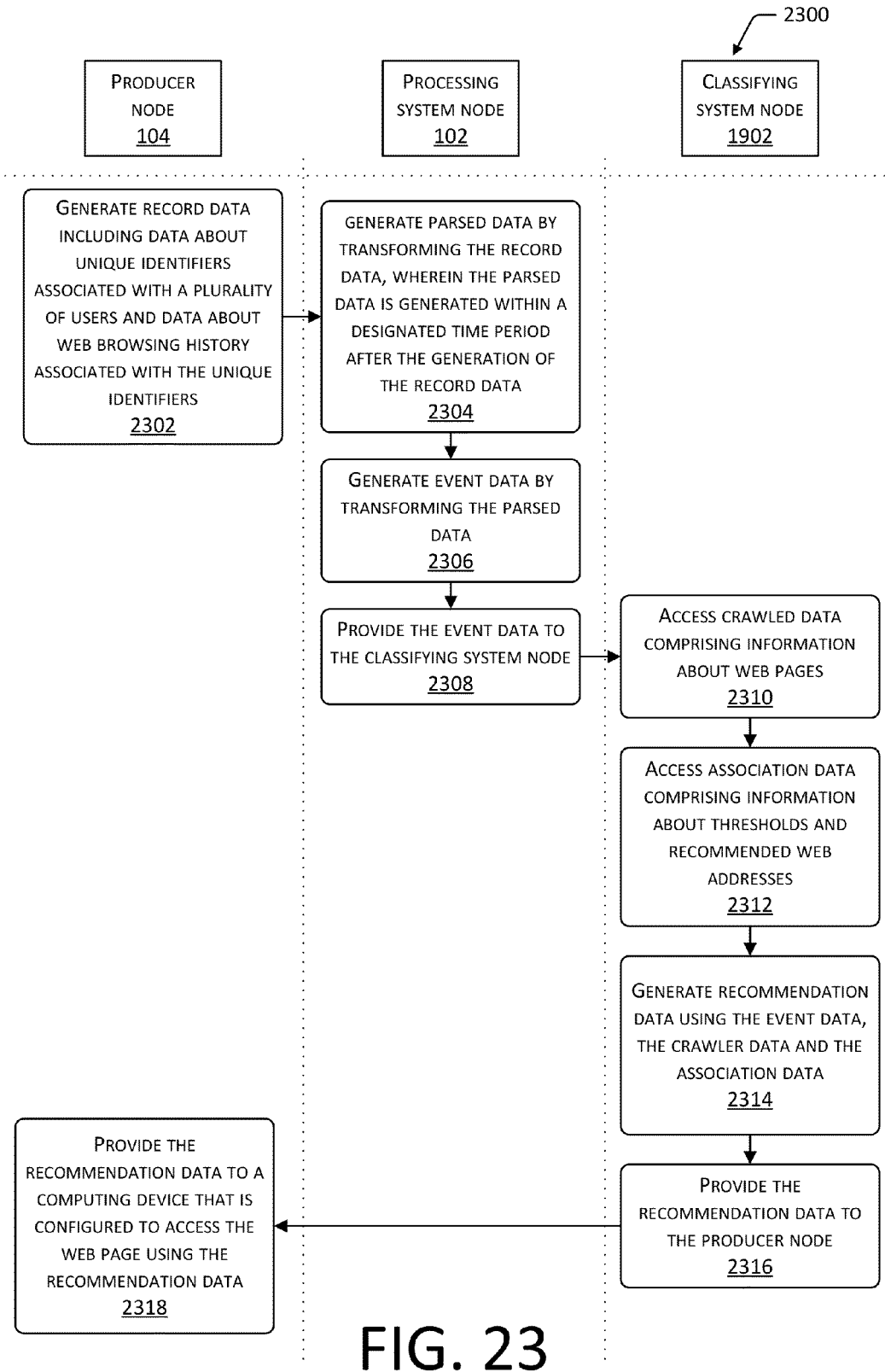
FIG. 23 is a flow diagram illustrating a process of providing recommendation data to a computing device based on the event data.

FIG. 23 is a flow diagram illustrating a process 2300 of providing the recommendation data 1922 to the computing device 1906 based on the event data 138. The processing system node 102, the producer node 104, and the classifying system node 1902 may implement the process 2300. Although the process 2300 is described with reference to the flowchart illustrated in FIG. 23, many other methods performing the acts associated with the process 2300 may be used. For example, the order of the steps may be changed, some of the steps described may be optional, and additional steps may be included.

At block 2302, the producer node 104 generates the record data 116 including data about unique identifiers 2112 associated with a plurality of users and data about web browsing history associated with the unique identifiers 2112.

At block 2304, the processing system node 102 generates the parsed data 134 by transforming the record data 116. The parsed data 134 may be generated within a designated time period after the generation of the record data 116. In some implementations, in response to a determination that the parsed data 134 is not generated within a designated amount of time from the generation of the record data 116, the processing system node 102 causes another computing node to operate in cooperation with the processing system node 102 such that subsequently generated parsed data 134 is generated within the designated amount of time.

At block 2306, the processing system node 102 generates the event data 138 by transforming the parsed data 134. The processing system node 102 may transform the parsed data 134 by applying the format data 126 to the parsed data 134. The format data 126 may comprise information about configuring the processing system node 102 to format the parsed data 134 and may be generated based on user input. At block 2308, the processing system node 102 provides the event data 138 to the classifying system node 1902.

At block 2310, the classifying system node 1902 accesses the crawled data 1918 comprising information about web pages. In some implementations, the crawler system node 1904 provides the crawled data 1918 to the classifying system node 1902.

At block 2312, the classifying system node 1902 accesses the association data 1924 comprising information about recommended web addresses 2108 and thresholds 2110. The thresholds 2110 may comprise logic which is processed by the classifying system node 1902 to determine whether to associate a particular unique identifier 2112 to a particular web address 2108. In some implementations, the classifying system node 1902 generates the association data 1924 using the event data 138. For example, based on a historical analysis of user interactions with a plurality of web pages, the classifying system node 1902 may generate association data 1924 which includes information about grouping certain users together. The classifying system node 1902 may analyze behavior data that indicates a particular user associated with a first unique identifier spends a designated amount of time on a first web page 2202 and a second web page 2202. In this example, the classifying system node 1902 determines that a new user associated with a second unique identifier spends the designated amount of time of the first web page 2202. Because the first user and the second user spend the designated amount of time on the first web page 2202, the classifying system node 1902 may generate association data 1924 that causes the second user to receive a recommendation that includes the second web page 2202.

The classifying system node 1902 may generate the association data 1924 within a designated amount of time after the generation of the event data 138. For example, the designated amount of time may be less than or equal to fifteen seconds.

At block 2314, the classifying system node 1902 generates the recommendation data 1922 using the event data 138, the crawled data 1918, and the association data 1924. At block 2316, the classifying system node 1902 provides the recommendation data 1922 to the producer node 104. At block 2318, the producer node 104 provides the recommendation data 1922 to the computing device 1906 that is configured to access the web page 2202 using the recommendation data 1922.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more hardware processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories ("ROMs"), RAMs, EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Additionally, those having ordinary skill in the art readily recognize that the techniques described above can be utilized in a variety of devices, environments and situations.

Embodiments of the disclosure can be described in view of the following clauses:

Clause 1. A system comprising:

at least one computing device configured to implement at least a first producer node, a second producer node, a processing system node, and a sink node, the processing system node including a first parse node and a second parse node, wherein:

the first producer node is configured to generate first record data comprising first recorded information about one or more first activities;

the first producer node is configured to provide the first record data to the processing system node;

the second producer node is configured to generate second record data comprising second recorded information about one or more second activities, the second record data being different in type from the first record data;

the second producer node is configured to provide the second record data to the processing system node;

the processing system node is configured to:
  allocate the first record data to the first parse node based on information included in the first record data; and
  provide an application programming interface;

the first parse node is configured to generate first parsed data by transforming, according to one or more transformation functions, the first record data, wherein the first parsed data is generated in real time;

the processing system node is configured to allocate the second record data to the second parse node based on information included in the second record data;

the second parse node is configured to generate second parsed data by transforming, according to one or more transformation functions, the second record data, the second parsed data being generated in real time;

the processing system node is configured to generate event data by transforming the first parsed data and the second parsed data;

the processing system node is configured to provide the event data to a sink node; the sink node is configured to perform a computational task based on the event data; and in response to a determination that one or more of the first parsed data or the second parsed data is generated greater than real time, the processing system node causes one or more computing devices to operate in cooperation with the processing system node such that subsequently generated parsed data is generated within real time.

Clause 2. The system of clause 1, wherein: the processing system node is configured to generate first producer configuration data; the processing system node is configured to provide the first producer configuration data to the first producer node; the processing system node is configured to generate second producer configuration data; the processing system node is configured to provide the second producer configuration data to the second producer node; the first record data is generated based on the first producer configuration data; and the second record data is generated based on the second producer configuration data.

Clause 3. The system of clauses 1 to 2, wherein: the sink node is configured to generate sink configuration data comprising data about configuring the processing system node; the sink node is configured to provide the sink configuration data to the processing system node; the event data is generated based on the sink configuration data; and the sink configuration data comprises at least one of:

endpoint data representing a request for the processing system node to provide the event data to the sink node;

percentage data representing a request for the processing system node to provide a percentage of the event data to the sink node; or format data comprising data about configuring the processing system node to format the event data.

Clause 4. A method comprising:

accessing, by a first computing node, first record data comprising:

a first record entry comprising information about a first activity; and a second record entry comprising information about a second activity, wherein the first computing node comprises one or more first computing devices, the one or more first computing devices comprising one or more first hardware processors and one or more first memory devices communicatively coupled to the one or more first hardware processors;

accessing, by the first computing node, first mapping data comprising data about mapping the first record entry and the second record entry;

accessing, by the first computing node, second record data comprising:

a third record entry comprising information about a third activity; and a fourth record entry comprising information about a fourth activity;

accessing, by the first computing node, second mapping data comprising data about mapping the third record entry and the fourth record entry, the second mapping data being configurable and different from the first mapping data;

generating, by the first computing node, first parsed data by transforming the first record data using the first mapping data, the first parsed data comprising:

a first parsed entry associated with the first record entry; and a second parsed entry associated with the second record entry;

generating, by the first computing node, second parsed data by transforming the second record data using the second mapping data, the second parsed data comprising:

a third parsed entry associated with the third record entry; and a fourth parsed entry associated with the fourth record entry; and generating, by the first computing node, event data by transforming the first parsed data and the second parsed data, wherein a second computing node uses the event data to perform a computational task, wherein the second computing node comprises one or more second computing devices, the one or more second computing devices comprising one or more second hardware processors and one or more second memory devices communicatively coupled to the one or more second hardware processors.

Clause 5. The method of clause 4, wherein the first parsed data and the second parsed data are generated contemporaneously.

Clause 6. The method of clauses 4 to 5, wherein:
the first parsed data is generated within a designated amount of time after generation of the first record data; and
the second parsed data is generated within the designated amount of time after generation of the second record data.

Clause 7. The method of clause 6, wherein the designated amount of time is less than or equal to fifteen seconds.

Clause 8. The method of clauses 4 to 7, further comprising in response to a determination that the first parsed data is generated in an amount of time exceeding a designated amount of time after a generation of the record data, causing a third computing node to operate in cooperation with the first computing node such that subsequently generated parsed data is generated within the designated amount of time, wherein the third computing node comprises one or more third computing devices, the one or more third computing devices comprising one or more third hardware processors and one or more third memory devices communicatively coupled to the one or more third hardware processors.

Clause 9. The method of clauses 4 to 8, wherein the transforming the first record data using the first mapping data includes at least one of:
converting the first record data to a markup language;
converting:
the first record entry to the first parsed entry; and
the second record entry to the second parsed entry;
changing an order of the first record entry and the second record entry; or converting the first record data such that the first record entry and the second record entry conform to a designated standard.

Clause 10. The method of clauses 4 to 9, wherein the first parsed data is generated by at least one of:
filtering the first record entry from the record data such that the first record entry is removed from the first record data; or
decorating the second record entry by supplementing the second record entry with other information.

Clause 11. The method of clauses 4 to 10, wherein the first record entry comprises at least one of:
text-based log data;
data indicative of access to a computing device;
data which indicates that information was transferred to an unauthorized computing device;
data indicating that an item was purchased; or
data indicating an occurrence of an error.

Clause 12. The method of clauses 4 to 11, wherein the first parsed entry comprises at least one of:
data indicative of access to a computing device;
data which indicates that information was transferred to an unauthorized computing device;
data indicating that an item was purchased; or
data indicating an occurrence of an error.

Clause 13. The method of clauses 4 to 12, wherein the event data comprises at least one of:
data indicative of access to a computing device;
data which indicates that information was transferred to an unauthorized computing device;
data indicating that an item was purchased; or
data indicating an occurrence of an error.

Clause 14. The method of clauses 4 to 13, wherein:
the record data comprises a human-readable log file; and
the event data comprises information which has been parsed, filtered, and mapped.

Clause 15. The method of clauses 4 to 14, further comprising:
generating, by the first computing node, producer configuration data; and
providing, by the first computing node, the producer configuration data to the second computing node, the second computing node being configured to generate the first record data using the producer configuration data, the producer configuration data comprising at least one of:
endpoint data representing a request for the second computing node to provide the first record data to the first computing node;
percentage data representing a request for the second computing node to provide a percentage of the first record data to the first computing node; or
protocol data representing a request for the second computing node to transmit the first record data to the first computing node using a designated transmission protocol.

Clause 16. The method of clauses 4 to 15, further comprising:
generating, by the first computing node, producer configuration data;
providing, by the first computing node, the producer configuration data to the second computing node;
generating, by the second computing device, primary data comprising a first primary data item and a second primary data item;
generating, by the second computing node, the first record data by removing one of the first primary data entry and the second primary data entry based on the producer configuration data; and
providing, by the second computing node, the first record data to the first computing node.

Clause 17. A method comprising:
accessing, by a processing system node, first record data comprising first recorded information about one or more first activities, the processing system node comprising one or more first computing devices, the processing system node including a first parse node and a second parse node;
allocating, by the processing system node, the first record data to the first parse node based on information included in the first record data;
accessing, by the processing system node, second record data comprising second recorded information about one or more second activities;
allocating, by the processing system node, the second record data to the second parse node based on information in the second record data;
generating, by the first parse node, first parsed data by transforming the first record data according to one or more transformation functions, the first parsed data being generated within a first designated amount of time from a generation of the first record data; and
generating, by the second parse node, second parsed data by transforming the second record data, the second parsed data being generated within a second designated amount of time from a generation of the second record data.

Clause 18. The method of clause 17, further comprising:

providing, by the processing system node, the first parsed data and the second parsed data to a first sink node and a second sink node, the second sink node being separate from the first sink node;

performing, by the first sink node, a first computational task using the first parsed data and the second parsed data; and performing, by the second sink node, a second computational task using the first parsed data and the second parsed data.

Clause 19. The method of clauses 17 to 18, further comprising:

providing, by a first producer node, the first record data to the processing system node using a first transmission protocol, the first producer node comprising one or more second computing devices; and providing, by a second producer node, the second record data to the processing system node using a second transmission protocol, the second transmission protocol being different from the first transmission protocol, the second producer node comprising one or more third computing devices.

Clause 20. The method of clauses 17 to 19, wherein:

the information in the first record data comprises first header data indicating a first type of the first record data; and the information in the second record data comprises second header data indicating a second type of the second record data, the second type being different from the first type.

Clause 21. A method comprising:

at least one computing device configured to implement at least a producer node, a processing system node, and a sink node, wherein:

the producer node is configured to generate record data comprising:

a first record entry comprising information about a first activity; and a second record entry comprising information about a second activity;

the processing system node is configured to access the record data, the processing system node being communicatively coupled to the producer node;

the processing system node is configured to access mapping data comprising data about mapping the first record entry and the second record entry;

the processing system node is configured to generate parsed data by transforming the record data using the mapping data, the parsed data being generated within a designated amount of time from the generation of the record data;

the sink node is configured to generate format data comprising data about configuring the processing system node to format the parsed data, the sink node being communicatively coupled to the processing system node;

the sink node is configured to provide the format data to the processing system node;

the processing system node is configured to generate event data by applying the format data to the parsed data;

the processing system node is configured to provide the event data to the sink node; and the sink node is configured to perform a computational task based on the event data.

Clause 22. The system of clause 21, wherein transforming the record data using the mapping data includes at least one of:

converting the first record entry to a first parsed entry, the first parsed entry included in the parsed data; or converting the second record entry to a second parsed entry, the second parsed entry included in the parsed data.

Clause 23. The system of clauses 21 to 22, wherein applying the format data to the parsed data includes at least one of:

filtering the first parsed entry from the parsed data such that the first parsed entry is removed from the parsed data; or decorating the second parsed entry by supplementing the second parsed entry with additional information.

Clause 24. A method comprising:

accessing, by a first computing node, record data comprising:

a first record entry comprising information about a first activity; and a second record entry comprising information about a second activity, wherein the first computing node comprises one or more first computing devices, the one or more first computing devices comprising one or more first hardware processors and one or more first memory devices communicatively coupled to the one or more first hardware processors;

generating within a designated amount of time from the generation of the record data, by the first computing node, parsed data by transforming the record data;

accessing, by the first computing node, format data comprising data about configuring the first computing node to format the parsed data, the format data being configurable; and generating, by the first computing node, event data by applying the format data to the parsed data, wherein a second computing node is configured to perform a computational task based on the event data, the second computing node comprising one or more second computing devices, the one or more second computing devices comprising one or more second hardware processors and one or more second memory devices communicatively coupled to the one or more second hardware processors.

Clause 25. The method of clause 24, wherein the parsed data is generated at a rate which is greater than or equal to a rate at which record data is received.

Clause 26. The method of clauses 24 to 25, wherein transforming the record data using the mapping data includes changing an order of the first record entry and the second record entry.

Clause 27. The method of clauses 24 to 26, wherein generating the parsed data by transforming the record data includes associating:

the first record entry with a first parsed entry, the first parsed entry included in the parsed data; and the second record entry with a second parsed entry, the second parsed entry included in the parsed data.

Clause 28. The method of clauses 24 to 27, wherein applying the format data to the parsed data includes at least one of:

filtering the first parsed entry from the parsed data such that the first parsed entry is removed from the parsed data; or decorating the second parsed entry by supplementing the second parsed entry with additional information.

Clause 29. The method of clauses 24 to 28, wherein applying the format data to the parsed data includes changing an order of the first record entry and the second record entry.

Clause 30. The method of clauses 24 to 29, wherein applying the format data to the parsed data includes converting the parsed data to a markup language.

Clause 31. The method of clauses 24 to 30, wherein the first record entry comprises at least one of:

text-based log data;

data indicative of access to a computing device;

data which indicates that information was transferred to an unauthorized computing device;

data indicating an item was purchased; or data indicating an occurrence of an error.

Clause 32. The method of clauses 24 to 31, wherein the parsed data comprises at least one of:
data indicative of access to a computing device;
data which indicates that information was transferred to an unauthorized computing device;
data indicating an item was purchased; or data indicating an occurrence of an error.

Clause 33. The method of clauses 24 to 32, wherein the event data comprises at least one of:
data indicative of access to a computing device;
data which indicates that information was transferred to an unauthorized computing device;
data indicating an item was purchased; or
data indicating an occurrence of an error.

Clause 34. The method of clauses 24 to 33, further comprising:
generating, by the second computing node, the format data, wherein the format data is generated based on user input; and
providing, by the second computing node, the format data to the first computing node.

Clause 35. The method of clauses 24 to 34, wherein the parsed data is stored at a primary system memory.

Clause 36. A method comprising:
generating, by a sink node, format data comprising data about configuring a processing system node to format event data, the processing system node communicatively coupled to the sink node, wherein the sink node comprises one or more first computing devices and the processing system node comprises one or more second computing devices;
providing, by the sink node, the format data to a configuration node;
providing, by the configuration node, the format data to the processing system node;
generating, by the processing system node, the event data by applying the format data to record data comprising recorded information about one or more activities, the event data being generated within a designated period of time from a generation of the record data;
accessing, by the sink node, the event data; and
performing, by the sink node, a computational task based on the event data.

Clause 37. The method of clause 36, wherein the performance of the computational task includes:
determining that a user has been granted access to a particular document; and
generating alarm data indicating that the user has been granted access to the particular document.

Clause 38. The method of clauses 36 to 37, wherein the performance of the computational task includes:
determining that information was transferred to an unauthorized computing device; and
generating alarm data indicating that the information was transferred to an unauthorized computing device.

Clause 39. The method of clauses 36 to 38, wherein the performance of the computational task includes determining that one or more items have been purchased.

Clause 40. The method of clauses 36 to 39, wherein the performance of the computational task includes:
determining that information was transferred to an unauthorized computing device; and
generating alarm data indicating that the information was transferred to the unauthorized computing device.

Clause 41. A system comprising:
one or more computing devices, the one or more computing devices configured to implement one or more of a sink node and a processing system node, wherein:
the sink node is configured to access first treatment data comprising a first web page;
the sink node is configured to provide the first treatment data to at least one second computing device configured to present the first web page;
the processing system node is configured to access record data comprising first recorded information about user interactions with the first web page, the processing system node being communicatively coupled to the sink node;
the processing system node is configured to generate parsed data by transforming the record data, the parsed data being generated within a designated amount of time from a generation of the record data;
the sink node is configured to generate format data comprising data about configuring the processing system node to format the parsed data;
the processing system node is configured to generate event data by applying the format data to the parsed data, the event data comprising data about configuring the sink node to provide second treatment data to the first computing device, the second treatment data comprising a second web page, the second web page being different from the first web page; and
in response to the receiving the event data, the sink node:
terminates providing the first treatment data to the at least one second computing device;
accesses the second treatment data; and
provides the second treatment data to the at least one second computing device.

Clause 42. The system of clause 41, wherein:
the record data comprises:
a first record entry comprising information about a first user interaction with the first web page; and
a second record entry comprising information about a second user interaction with the first web page;
the parsed data comprises a first parsed entry and a second parsed entry; and
generating the parsed data by transforming the record data includes associating:
the first record entry with the first parsed entry; and
the second record entry with the second parsed entry.

Clause 43. The system of clauses 41 to 42, wherein:
the parsed data comprises a first parsed entry and a second parsed entry; and
applying the format data to the parsed data includes at least one of:
filtering the first parsed entry from the parsed data such that the first parsed entry is removed from the parsed data; and
decorating the second parsed entry by supplementing the second parsed entry with additional information.

Clause 44. A method comprising:
accessing, by a first computing node, first treatment data comprising a first service response, the first computing node comprising one or more computing devices;
providing, by the first computing node, the first treatment data to one or more second computing devices configured to perform a computational task using the service response;
accessing, by a second computing node, record data comprising recorded information about success metrics associated with the service response, the second computing node being communicatively coupled to the first computing node, the second computing node comprising one or more third computing devices;
generating, by the second computing node, parsed data by transforming the record data;
generating, by the second computing node, event data by transforming the parsed data;
analyzing, by the first computing node, the event data; and automatically changing, by the first computing node, the first treatment data that is being provided to the first computing device to second treatment data based on the analysis of the event data, the second treatment data comprising a second service response.

Clause 45. The method of clause 44, wherein the parsed data is generated within a designated amount of time after a generation of the record data.

Clause 46. The method of clauses 44 to 45, wherein the success metrics comprise one or more quantitative measurements of an operation or performance of the one or more second computing devices.

Clause 47. The method of clauses 44 to 46, further comprising, in response to a determination that a time to generate the parsed data relative to generation of the record data exceeds a threshold value, causing a third computing node to operate in cooperation with the second computing node such that subsequently generated parsed data is generated within the designated amount of time.

Clause 48. The method of clauses 44 to 47, wherein:
the record data comprises:
a first record entry comprising information about a first activity; and
a second record entry comprising information about a second activity; and
transforming the record data includes changing an order of the first record entry and the second record entry.

Clause 49. The method of clauses 44 to 48, further comprising:
generating, by the first computing node, format data comprising data about configuring the second computing node to format the parsed data; and
providing, by the first computing node, the format data to the second computing node, wherein generating the event data includes applying the format data to the parsed data.

Clause 50. The method of clause 49, wherein:
the parsed data comprises a first parsed entry and a second parsed entry;
applying the format data to the parsed data includes at least one of:
filtering the first parsed entry from the parsed data such that the first parsed entry is removed from the parsed data; or
decorating the second parsed entry by supplementing the second parsed entry with additional information.

Clause 51. The method of clauses 49 to 50, wherein:
the first service response comprises data representative of a first web page;
the second service response comprises data representative of a second web page;
performing the computational task includes pressing the first web page; and
the success metrics comprise data about user interactions with the first web page.

Clause 52. The method of clauses 49 to 51, wherein the format data is generated based on user input.

Clause 53. The method of clauses 44 to 52, wherein:
the first treatment data comprises first marketing data configured to cause the first computing device to display an advertisement at a first location of a display screen of the computing device; and
the second treatment data comprises second marketing data configured to cause the first computing device to display the advertisement at a second location of the display screen.

Clause 54. The method of clauses 44 to 53, wherein the first computing node changes the first treatment data to the second treatment data in response to a determination that a click rate is equal to or less than a threshold value when the advertisement is displayed at the first position.

Clause 55. The method of clause 44 to 54, wherein the record data comprises at least one of:
text-based log data;
data indicating a user selection of a displayed advertisement;
data indicating information was transferred to a particular computing device;
data indicating an item was purchased; or
data indicating an occurrence of an error.

Clause 56. The method of clauses 44 to 55, wherein the parsed data comprises at least one of:
data indicating a user selection of a displayed advertisement;
data indicating information was transferred to a particular computing device;
data indicating an item was purchased; or
data indicating an occurrence of an error.

Clause 57. The method of clauses 44 to 56, wherein the event data comprises at least one of:
data indicating a user selection of a displayed advertisement;
data indicating information was transferred to a particular computing device;
data indicating an item was purchased; or
data indicating an occurrence of an error.

Clause 58. A method comprising:
accessing, by a first computing node, record data comprising recorded information about one or more first activities, the first computing node comprising one or more first computing devices, the one or more first computing devices comprising one or more first hardware processors and one or more first memory devices communicatively coupled to the one or more first hardware processors;
generating, by the first computing node, parsed data by transforming the record data, the parsed data being generated within a designated amount of time after a generation of the record data;
accessing, by the first computing node, format data comprising data about configuring the first computing node to format the parsed data;
generating, by the first computing node, configuration data by applying the format data to the parsed data, the configuration data comprising data about selecting one of a plurality of different treatment data, the plurality of different treatment data comprising a plurality of different web pages;
providing, by the first computing node, the configuration data to a second computing node communicatively coupled to the first computing node, the second computing node comprising one or more second computing devices, the one or more second computing devices comprising one or more second hardware processors and one or more second memory devices communicatively coupled to the one or more second hardware processors;
automatically selecting, by the second computing node, one of the plurality of different treatments based on the configuration data; and
causing one or more third computing devices to access the selected treatment.

Clause 59. The method of clause 58, wherein the parsed data is generated within a designated amount of time after a generation of the record data based on the first computing node not storing the record data at a datastore, a buffer, or a cache.

Clause 60. The method of clauses 58 to 59, wherein the parsed data is generated within a designated amount of time after a generation of the record data based on processing the record data when the processing system node receives the record data.

Clause 61. A system comprising:
generating, by a producer node, record data comprising recorded information, the recorded information including:
unique identifier data comprising unique identifiers associated with a plurality of users; and
web browsing data comprising information about web browsing history associated with the unique identifiers, wherein the producer node comprises one or more first computing devices, the one or more first computing devices comprising one or more first hardware processors and one or more first memory devices communicatively coupled to the one or more first hardware processors;
accessing, by a processing system node, the record data, wherein the processing system node is communicatively coupled to the producer node, the processing system node comprising one or more second computing devices, the one or more second computing devices comprising one or more second hardware processors and one or more second memory devices communicatively coupled to the one or more second hardware processors;
generating, by the processing system node, parsed data by transforming the record data, the parsed data being generated within a designated time period after the generation of the record data;
generating, by the processing system node, event data by transforming the parsed data;
providing, by the processing system node, the event data to a classifying system node, wherein the classifying system is communicatively coupled to the processing system node and the producer node, the classifying system node comprising one or more third computing devices, the one or more third computing devices comprising one or more third hardware processors and one or more third memory devices communicatively coupled to the one or more third hardware processors;
generating, by a crawling system node, crawled data comprising information about web pages, wherein the crawling system node is communicatively coupled to the classifying system node, the crawling system node comprising one or more fourth computing devices, the one or more fourth computing devices comprising one or more fourth hardware processors and one or more fourth memory devices communicatively coupled to the one or more fourth hardware processors;
providing, by the crawling system node, the crawled data to the classifying system node;
accessing, by the classifying system node, association data comprising data about thresholds and recommended web addresses;
generating, by the classifying system node, recommendation data using the event data, the crawled data, and the associated data, the recommendation data comprising at least one unique identifier associated with at least one recommended web address;
providing, by the classifying system node, the recommendation data to the producer node; and
providing, by the producer node, the recommendation data to a computing device configured to access the at least one recommended web address using the recommendation data.

Clause 62. The system of clause 61, the record data comprising:
a first record entry comprising a first unique identifier; and
a second record entry comprising information about web browsing history associated with the first unique identifier;
the parsed data comprises a first parsed entry and a second parsed entry; and
generating the parsed data by transforming the record data includes associating:
the first record entry with the first parsed entry; and
the second record entry with the second parsed entry.

Clause 63. The system of clauses 61 to 62, further comprising:
generating, by the classifying system node, format data comprising data about configuring the processing system node to format the parsed data; and
providing, by the classifying system node, the format data to the processing system node, wherein generating the event data includes applying the format data to the parsed data.

Clause 64. A method comprising:
generating, by a first computing node, parsed data using record data comprising recorded information, the first computing node comprising one or more first computing devices;
generating, by the first computing node, event data by applying format data to the parsed data, the format data being configurable, the event data comprising data about unique identifiers associated with a plurality of users and data about web browsing history associated with the unique identifiers;
accessing, by a second computing node, the event data, the second computing node comprising one or more second computing devices;
accessing, by the second computing node, crawled data comprising information about web pages;
accessing, by the second computing node, association data comprising data about thresholds and recommended web addresses;
generating, by the second computing node, recommendation data using the event data, the crawled data, and the association data, the recommendation data including:
data representative of at least one of the unique identifiers; and data representative of at least one recommended web addresses which is associated with the at least one of the unique identifiers; and
causing one or more third computing devices to receive the recommendation data, the one or more third computing devices being configured to access the recommended web address.

Clause 65. The method of clause 64, wherein the parsed data is generated within a designated amount of time after a generation of the record data.

Clause 66. The method of clauses 64 to 65, further comprising in response to a determination that the parsed data is not generated within a designated amount of time from a generation of the record data, causing a third computing node to operate in cooperation with the first computing node such that subsequently generated parsed data is generated within the designated amount of time, the third computing node comprising one or more fourth computing devices.

Clause 67. The method of clauses 64 to 66, the record data comprising:
a first record entry comprising a first unique identifier; and
a second record entry comprising information about web browsing history associated with the first unique identifier; and
transforming the record data includes changing an order of the first record entry and the second record entry.

Clause 68. The method of clauses 64 to 67, further comprising:
generating, by the second computing node, the format data, wherein the format data comprises information about configuring the first computing node to format the parsed data; and providing, by the second computing node, the format data to the first computing node, wherein the event data is generated by applying the format data to the parsed data.

Clause 69. The method of clauses 64 to 68, wherein the parsed data comprises a first parsed entry and a second parsed entry; and applying the format data to the parsed data includes at least one of:

filtering the first parsed entry from the parsed data such that the first parsed entry is removed from the parsed data; and decorating the second parsed entry by supplementing the second parsed entry with additional information.

Clause 70. The method of clauses 64 to 69, wherein applying the format data to the parsed data includes converting the parsed data to a markup language.

Clause 71. The method of clauses 64 to 70, wherein the format data is generated based on user input.

Clause 72. The method of clauses 64 to 71, wherein the record data comprises at least one of:

text-based log data;

data indicating a user selection of a displayed advertisement; or data indicating user selections of a plurality of different web pages.

Clause 73. The method of clauses 64 to 72, wherein the parsed data comprises at least one of:

data indicating a user selection of a displayed advertisement; or data indicating a user selection of a displayed web address.

Clause 74. The method of clauses 64 to 73, wherein the event data comprises at least one of:

data indicating a user selection of a displayed advertisement; or data indicating a user selection of a displayed web address.

Clause 75. The method of clauses 64 to 74, wherein the computing device receives the recommendation data in response to providing a request for content to a web server.

Clause 76. The method of clauses 64 to 75, further comprising generating, by the second computing node, the association data using the event data, wherein:

the association data is generated within a designated amount of time after a generation of the event data; and the event data comprises information about user interactions with one or more web pages.

Clause 77. The method of clauses 64 to 76, further comprising generating, by a third computing node, the record data, the third computing node using a web browser which includes a first subsystem and a second subsystem, wherein:

the third computing node executes the first subsystem;

the computing device executes the second subsystem; and the record data comprises information indicating user selections of a plurality of different web pages.

Clause 78. A method comprising:

accessing, by a processing system node, record data comprising recorded information, the processing system node comprising one or more computing devices;

generating, by the processing system node, parsed data using the record data, the parsed data being generated within a designated time period after a generation of the record data;

accessing, by the processing system node, format data comprising data about configuring the processing system node to format the parsed data;

generating, by the processing system node, event data using the parsed data and the format data, the event data comprising data about unique identifiers associated with a plurality of users and data about web browsing history associated with the unique identifiers; and providing, by the processing system node, the event data to a sink node communicatively coupled to the processing system node, the sink node configured to generate recommendation data using the event data, the recommendation data comprising data representative of at least one of the unique identifiers and data representative of at least one recommended web address which is associated with the at least one of the unique identifiers, wherein the sink node comprises one or more second computing devices.

Clause 79. The method of clause 78, wherein the one or more first computing devices comprise one or more hardware processors and one or more memory devices communicatively coupled to the one or more hardware processors.

Clause 80. The method of clauses 78 to 79, the recommendation data being generated within a designated amount of time after a generation of the record data.

Although the present disclosure is written with respect to specific embodiments and implementations, various changes and modifications may be suggested to one skilled in the art, and it is intended that the present disclosure encompasses such changes and modifications that fall within the scope of the appended claims.

What is claimed is:

1. A system comprising:
at least one computing device configured to implement at least a first producer node, a second producer node, a processing system node, and a sink node, the processing system node including a first parse node and a second parse node, wherein:
the first producer node is configured to generate first record data comprising first recorded information about one or more first activities;
the first producer node is configured to provide the first record data to the processing system node;
the second producer node is configured to generate second record data comprising second recorded information about one or more second activities, the second record data being different in type from the first record data;
the second producer node is configured to provide the second record data to the processing system node;
the processing system node is configured to:
allocate the first record data to the first parse node based on information included in the first record data; and
provide an application programming interface;
the first parse node is configured to generate first parsed data by transforming, according to one or more transformation functions, the first record data, wherein the first parsed data is generated in real time;
the processing system node is configured to allocate the second record data to the second parse node based on information included in the second record data;
the second parse node is configured to generate second parsed data by transforming, according to one or more transformation functions, the second record data, the second parsed data being generated in real time;
the processing system node is configured to generate event data by transforming the first parsed data and the second parsed data;
the processing system node is configured to provide the event data to a sink node;
the sink node is configured to perform a computational task based on the event data; and
in response to a determination that one or more of the first parsed data or the second parsed data is generated greater than real time, the processing system node causes one or more computing devices to operate in cooperation with the processing system node such that subsequently generated parsed data is generated within real time.

2. The system of claim 1, wherein:
the processing system node is configured to generate first producer configuration data;
the processing system node is configured to provide the first producer configuration data to the first producer node;
the processing system node is configured to generate second producer configuration data;
the processing system node is configured to provide the second producer configuration data to the second producer node;
the first record data is generated based on the first producer configuration data; and
the second record data is generated based on the second producer configuration data.

3. The system of claim 1, wherein:
the sink node is configured to generate sink configuration data comprising data about configuring the processing system node;
the sink node is configured to provide the sink configuration data to the processing system node;
the event data is generated based on the sink configuration data; and
the sink configuration data comprises at least one of:
endpoint data representing a request for the processing system node to provide the event data to the sink node;
percentage data representing a request for the processing system node to provide a percentage of the event data to the sink node; or
format data comprising data about configuring the processing system node to format the event data.

4. A method comprising:
accessing, by a first computing node, first record data comprising:
a first record entry comprising information about a first activity; and
a second record entry comprising information about a second activity, wherein the first computing node comprises one or more first computing devices, the one or more first computing devices comprising one or more first hardware processors and one or more first memory devices communicatively coupled to the one or more first hardware processors;
accessing, by the first computing node, first mapping data comprising data about mapping the first record entry and the second record entry;
accessing, by the first computing node, second record data comprising:
a third record entry comprising information about a third activity; and
a fourth record entry comprising information about a fourth activity;
accessing, by the first computing node, second mapping data comprising data about mapping the third record entry and the fourth record entry, the second mapping data being configurable and different from the first mapping data;
generating, by the first computing node, first parsed data by transforming the first record data using the first mapping data, the first parsed data comprising:
a first parsed entry associated with the first record entry; and
a second parsed entry associated with the second record entry;
generating, by the first computing node, second parsed data by transforming the second record data using the second mapping data, the second parsed data comprising:
a third parsed entry associated with the third record entry; and
a fourth parsed entry associated with the fourth record entry; and
generating, by the first computing node, event data by transforming the first parsed data and the second parsed data, wherein a second computing node uses the event data to perform a computational task, wherein the second computing node comprises one or more second computing devices, the one or more second computing devices comprising one or more second hardware processors and one or more second memory devices communicatively coupled to the one or more second hardware processors.

5. The method of claim 4, wherein the first parsed data and the second parsed data are generated contemporaneously.

6. The method of claim 4, wherein:
the first parsed data is generated within a designated amount of time after generation of the first record data; and
the second parsed data is generated within the designated amount of time after generation of the second record data.

7. The method of claim 6, wherein the designated amount of time is less than or equal to fifteen seconds.

8. The method of claim 4, further comprising in response to a determination that the first parsed data is generated in an amount of time exceeding a designated amount of time after a generation of the record data, causing a third computing node to operate in cooperation with the first computing node such that subsequently generated parsed data is generated within the designated amount of time, wherein the third computing node comprises one or more third computing devices, the one or more third computing devices comprising one or more third hardware processors and one or more third memory devices communicatively coupled to the one or more third hardware processors.

9. The method of claim 4, wherein the transforming the first record data using the first mapping data includes at least one of:
converting the first record data to a markup language;
converting:
the first record entry to the first parsed entry; and
the second record entry to the second parsed entry;
changing an order of the first record entry and the second record entry; or
converting the first record data such that the first record entry and the second record entry conform to a designated standard.

10. The method of claim 4, wherein the first parsed data is generated by at least one of:
filtering the first record entry from the record data such that the first record entry is removed from the first record data; or
decorating the second record entry by supplementing the second record entry with other information.

11. The method of claim 4, wherein the first record entry comprises at least one of:
text-based log data;
data indicative of access to a computing device;
data which indicates that information was transferred to an unauthorized computing device;
data indicating that an item was purchased; or
data indicating an occurrence of an error.

12. The method of claim 4, wherein the first parsed entry comprises at least one of:
   data indicative of access to a computing device;
   data which indicates that information was transferred to an unauthorized computing device;
   data indicating that an item was purchased; or
   data indicating an occurrence of an error.

13. The method of claim 4, wherein the event data comprises at least one of:
   data indicative of access to a computing device;
   data which indicates that information was transferred to an unauthorized computing device;
   data indicating that an item was purchased; or
   data indicating an occurrence of an error.

14. The method of claim 4, wherein:
   the record data comprises a human-readable log file; and
   the event data comprises information which has been parsed, filtered, and mapped.

15. The method of claim 4, further comprising:
   generating, by the first computing node, producer configuration data; and
   providing, by the first computing node, the producer configuration data to the second computing node, the second computing node being configured to generate the first record data using the producer configuration data, the producer configuration data comprising at least one of:
      endpoint data representing a request for the second computing node to provide the first record data to the first computing node;
      percentage data representing a request for the second computing node to provide a percentage of the first record data to the first computing node; or
      protocol data representing a request for the second computing node to transmit the first record data to the first computing node using a designated transmission protocol.

16. The method of claim 4, further comprising:
   generating, by the first computing node, producer configuration data;
   providing, by the first computing node, the producer configuration data to the second computing node;
   generating, by the second computing device, primary data comprising a first primary data item and a second primary data item;
   generating, by the second computing node, the first record data by removing one of the first primary data entry and the second primary data entry based on the producer configuration data; and
   providing, by the second computing node, the first record data to the first computing node.

17. A method comprising:
   accessing, by a processing system node, first record data comprising first recorded information about one or more first activities, the processing system node comprising one or more first computing devices, the processing system node including a first parse node and a second parse node;
   allocating, by the processing system node, the first record data to the first parse node based on information included in the first record data;
   accessing, by the processing system node, second record data comprising second recorded information about one or more second activities;
   allocating, by the processing system node, the second record data to the second parse node based on information in the second record data;
   generating, by the first parse node, first parsed data by transforming the first record data according to one or more transformation functions, the first parsed data being generated within a first designated amount of time from a generation of the first record data; and
   generating, by the second parse node, second parsed data by transforming the second record data, the second parsed data being generated within a second designated amount of time from a generation of the second record data.

18. The method of claim 17, further comprising:
   providing, by the processing system node, the first parsed data and the second parsed data to a first sink node and a second sink node, the second sink node being separate from the first sink node;
   performing, by the first sink node, a first computational task using the first parsed data and the second parsed data; and
   performing, by the second sink node, a second computational task using the first parsed data and the second parsed data.

19. The method of claim 17, further comprising:
   providing, by a first producer node, the first record data to the processing system node using a first transmission protocol, the first producer node comprising one or more second computing devices; and
   providing, by a second producer node, the second record data to the processing system node using a second transmission protocol, the second transmission protocol being different from the first transmission protocol, the second producer node comprising one or more third computing devices.

20. The method of claim 17, wherein:
   the information in the first recorded data comprises first header data indicating a first type of the first record data; and
   the information in the second recorded data comprises second header data indicating a second type of the second record data, the second type being different from the first type.

* * * * *